(12) United States Patent
Astle et al.

(10) Patent No.: US 12,168,187 B2
(45) Date of Patent: *Dec. 17, 2024

(54) FILTER INTERCONNECTS UTILIZING MAGNETIC SHEAR FORCE GENERATED BY CODED POLYMAGNETS

(71) Applicant: KX Technologies LLC, West Haven, CT (US)

(72) Inventors: Robert Astle, Middlefield, CT (US); Garett Strandemo, Evansville, IN (US); Jordan Robert Fuhs, Fort Branch, IN (US); Matthew W. Hartmann, Evansville, IN (US); Gregory Gene Hortin, Henderson, KY (US); Jason Morgan, Madison, AL (US)

(73) Assignee: KX Technologies LLC, West Haven, CT (US)

( * ) Notice: Subject to any disclaimer, the term of this patent is extended or adjusted under 35 U.S.C. 154(b) by 349 days.

This patent is subject to a terminal disclaimer.

(21) Appl. No.: 17/006,326

(22) Filed: Aug. 28, 2020

(65) Prior Publication Data

US 2021/0060469 A1 Mar. 4, 2021

Related U.S. Application Data

(60) Provisional application No. 63/040,110, filed on Jun. 17, 2020, provisional application No. 63/015,840, (Continued)

(51) Int. Cl.
*B01D 46/00* (2022.01)
*B01D 27/08* (2006.01)
(Continued)

(52) U.S. Cl.
CPC ............ *B01D 27/08* (2013.01); *B01D 35/30* (2013.01); *B01D 46/0005* (2013.01);
(Continued)

(58) Field of Classification Search
CPC .... B01D 27/08; B01D 35/30; B01D 46/0005; B01D 2201/305; B01D 2201/4046;
(Continued)

(56) References Cited

U.S. PATENT DOCUMENTS 3,420,266 A 1/1969 Downey
3,521,216 A 7/1970 Tolegian et al.
(Continued)

FOREIGN PATENT DOCUMENTS

CN 20409979 1/2015
EP 2438601 3/2017

*Primary Examiner* — Dirk R Bass
(74) *Attorney, Agent, or Firm* — DeLio Peterson & Curcio LLC; Robert Curcio

(57) ABSTRACT

A filtration system interconnection structure having a filter manifold and a filter cartridge in magnetic communication with one another, such that a latching mechanism of the manifold secures the filter cartridge within a manifold sump when the filter cartridge is inserted therein. The magnetic communication is formed between two complementary coded polymagnets capable of producing a magnetic shear force when in close proximity to one another. The magnetic shear force removes a latch blocking structure from interfering with the latch, allowing the latch to secure the filter cartridge. Movement of the latch blocking structure coded polymagnet relative to the filter cartridge coded polymagnet may be perpendicular or parallel with respect to each other such that a shear force is generated therebetween, allowing for actuation of the latch blocking mechanism against a biasing force, and allowing the latch to move radially inwards against a separate biasing force.

32 Claims, 21 Drawing Sheets

Related U.S. Application Data filed on Apr. 27, 2020, provisional application No. 62/892,811, filed on Aug. 28, 2019.

(51) Int. Cl.

| | | |
|---|---|---|
| *B01D 35/30* | (2006.01) | |
| *H01F 7/02* | (2006.01) | |
| *H01F 7/04* | (2006.01) | |
| *E05B 65/00* | (2006.01) | |
| *E05C 19/16* | (2006.01) | |

(52) U.S. Cl.
CPC ........... *H01F 7/021* (2013.01); *H01F 7/0242* (2013.01); *H01F 7/04* (2013.01); *B01D 2201/305* (2013.01); *B01D 2201/4046* (2013.01); *B01D 2201/4069* (2013.01); *B01D 2201/52* (2013.01); *B01D 2265/023* (2013.01); *E05B 65/006* (2013.01); *E05C 19/16* (2013.01)

(58) Field of Classification Search
CPC ........ B01D 2201/4069; B01D 2201/52; B01D 2265/023; B01D 2201/303; B01D 2201/4015; B01D 46/001; B01D 2265/026; B01D 29/11; H01F 7/0242; H01F 7/021; H01F 7/04; H01F 7/0252; E05B 65/006; E05B 19/16
See application file for complete search history.

(56) References Cited

U.S. PATENT DOCUMENTS

| | | | |
|---|---|---|---|
| 4,468,321 A | 8/1984 | St. John | |
| 5,527,450 A | 6/1996 | Burrows | |
| 6,003,734 A | 12/1999 | Oh | |
| 7,800,471 B2 | 9/2010 | Fullerton et al. | |
| 7,800,473 B2 | 9/2010 | Fullerton et al. | |
| 7,808,348 B2 | 10/2010 | Fullerton et al. | |
| 7,808,349 B2 | 10/2010 | Fullerton et al. | |
| 7,808,350 B2 | 10/2010 | Fullerton et al. | |
| 7,817,006 B2 | 10/2010 | Fullerton et al. | |
| 7,893,803 B2 | 2/2011 | Fullerton et al. | |
| 8,098,122 B2 | 1/2012 | Fullerton et al. | |
| 8,279,032 B1 | 10/2012 | Fullerton et al. | |
| 8,314,671 B2 | 11/2012 | Fullerton et al. | |
| 8,314,672 B2 | 11/2012 | Fullerton et al. | |
| 8,461,952 B1 | 6/2013 | Fullerton et al. | |
| 8,570,129 B2 | 10/2013 | Fullerton | |
| 8,760,252 B2 | 6/2014 | Fullerton et al. | |
| 8,872,608 B2 | 10/2014 | Fullerton et al. | |
| 8,963,668 B2 | 2/2015 | Fullerton et al. | |
| 9,233,322 B1 | 1/2016 | Huda | |
| 10,129,667 B2 | 11/2018 | Gustafsson | |
| 10,173,292 B2 | 1/2019 | Fullerton et al. | |
| 2003/0042191 A1 | 6/2003 | Nam et al. | |
| 2003/0226790 A1* | 12/2003 | Brown | B01D 29/96 210/441 |
| 2007/0194578 A1* | 8/2007 | Boosey | E05C 19/163 292/251.5 |
| 2008/0179236 A1* | 7/2008 | Wieczorek | F02M 37/42 210/235 |
| 2010/0140521 A1 | 6/2010 | Burgess et al. | |
| 2010/0212259 A1 | 8/2010 | Knieling et al. | |
| 2010/0264078 A1 | 10/2010 | Bassett | |
| 2011/0114862 A1 | 5/2011 | Zimmerman et al. | |
| 2011/0258976 A1* | 10/2011 | Krueger | B01D 46/06 55/374 |
| 2012/0229241 A1 | 9/2012 | Fullerton et al. | |
| 2013/0068673 A1 | 3/2013 | Maggiore et al. | |
| 2013/0180898 A1* | 7/2013 | Chajec | B01D 35/30 210/85 |
| 2013/0240431 A1 | 9/2013 | Foix et al. | |
| 2014/0374336 A1* | 12/2014 | Sherman | B01D 35/30 210/232 |
| 2016/0194229 A1 | 7/2016 | Mehdi | |
| 2017/0072347 A1 | 3/2017 | Schmoll | |
| 2017/0259196 A1 | 9/2017 | Foix et al. | |
| 2018/0111129 A1 | 4/2018 | Adey et al. | |
| 2018/0221795 A1 | 8/2018 | Bonifas et al. | |
| 2018/0245429 A1 | 8/2018 | Bhadbjade | |
| 2019/0039005 A1 | 2/2019 | Suthar et al. | |
| 2019/0351352 A1 | 11/2019 | Chandra et al. | |
| 2019/0351354 A1 | 11/2019 | Chandra et al. | |
| 2020/0001211 A1 | 1/2020 | Li | |

* cited by examiner

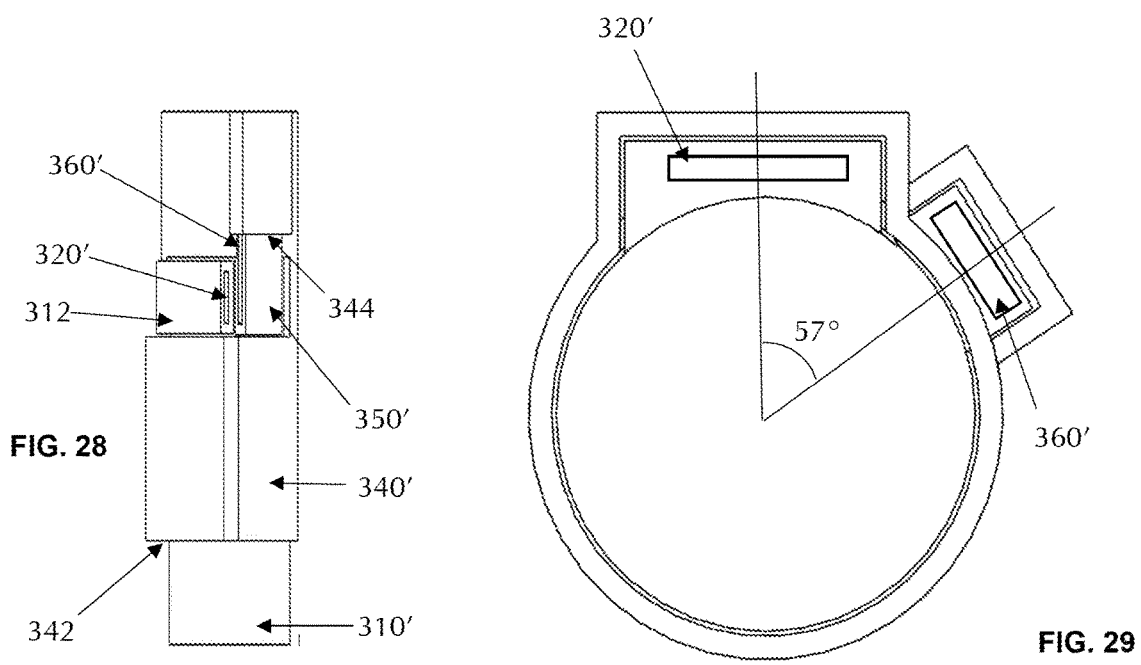
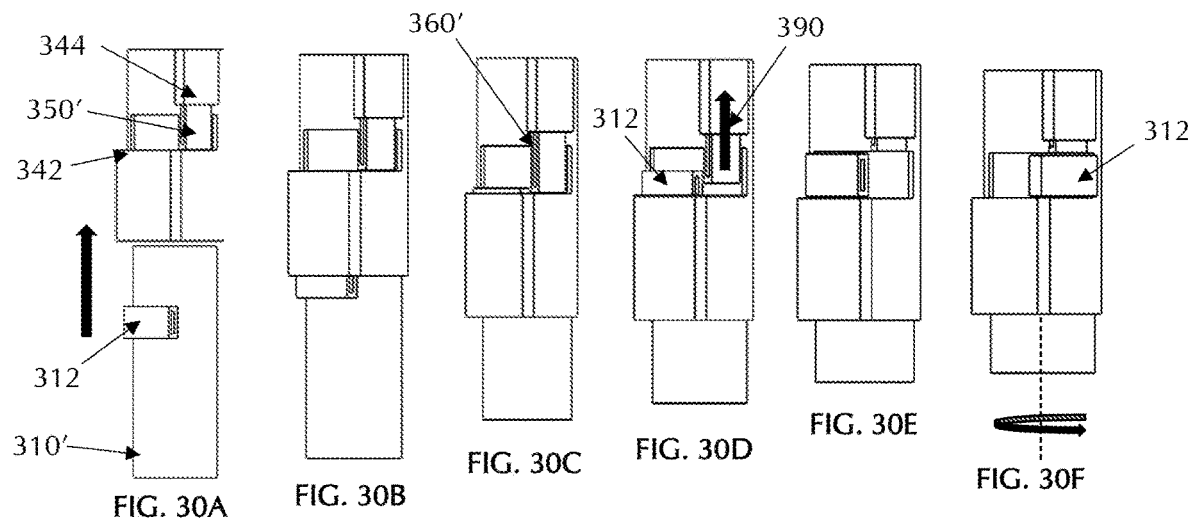

FILTER INTERCONNECTS UTILIZING MAGNETIC SHEAR FORCE GENERATED BY CODED POLYMAGNETS

BACKGROUND OF THE INVENTION

1. Field of the Invention

The present invention relates generally to the interconnection scheme between a filter cartridge and its corresponding manifold. The invention utilizes a correlated magnetism design that encompasses coded polymagnets, and more specifically, a magnetic attraction, repulsion, or combination thereof, to generate shear force. The magnetic force is introduced upon filter cartridge insertion into a mating filter manifold to aid in interconnection, in specific instances, to latch the filter cartridge within the manifold, to activate or deactivate a latching mechanism, switch, or valve, or engage or disengage an engagement mechanism relative to other components upon interconnection.

2. Description of Related Art

Correlated magnet designs were introduced in U.S. Pat. No. 7,800,471 issued to Cedar Ridge Research LLC on Sep. 21, 2010, entitled "FIELD EMISSION SYSTEM AND METHOD" (the "'471 Patent"). This patent describes field emission structures having electric or magnetic field sources. The magnitudes, polarities, and positions of the magnetic or electric field sources are configured to have desirable correlation properties, which are in accordance with a predetermined code. The correlation properties correspond to a special force function where spatial forces correspond to relative alignment, separation distance, and unique spatial force functions.

In U.S. Pat. No. 7,817,006, issued to Cedar Ridge Research LLC on Oct. 19, 2010, titled "APPARATUS AND METHODS RELATING TO PRECISION ATTACHMENTS BETWEEN FIRST AND SECOND COMPONENT" (a related patent to the '471 Patent), an attachment scheme between first and second components is taught. Generally, a first component includes a first field emission structure and the second component includes a second field emission structure, wherein each field emission structure includes multiple magnetic field emission sources (magnetic array) having positions and polarities relating to a predefined spatial force function that corresponds to a predetermined alignment of the field emission structures. The components are adapted to be attached to each other when the first field emission structure is in proximity of the second field emission structure.

When correlated magnets are brought into alignment with complementary or mirror image counterparts, the various magnetic field emission sources that make up each correlated magnet will align causing a peak spatial attraction force, while a misalignment will cause the various magnetic field emission sources to substantially cancel each other out. The spatial forces (attraction, repulsion) have a magnitude that is a function of the relative alignment of two magnetic field emission structures, the magnetic field strengths, and their various polarities.

It is possible for the polarity of individual magnet sources to be varied in accordance with a code without requiring a holding mechanism to prevent magnetic forces from "flipping" a magnet. As an illustrious example of this magnetic action, an apparatus 1000 of the prior art is depicted in FIG. 1. Apparatus 1000 includes a first component 1002 and a second component 1012. The first component includes a first field emission structure 1004 comprising multiple field emission sources 1006. The second component includes a second field emission structure 1014 comprising multiple field emission sources 1016. The first and second components are adapted to attach to one another when the first field emission structure 1004 is in proximity of the second field emission structure 1014, that is, they are in a predetermined alignment with respect to one another.

The first field emission structure 1004 may be configured to interact with the second field emission structure 1014 such that the second component 1012 can be aligned to become attached (attracted) to the first component 1002 or misaligned to become removed (repulsed) from the first component. The first component 1002 can be released from the second component 1012 when their respective first and second field emission structures 1004 and 1014 are moved with respect to one another to become misaligned.

Generally, the precision within which two or more field emission structures tend to align increases as the number N of different field emission sources in each field emission structure increases, including for a given surface area A. In other words, alignment precision may be increased by increasing the number N of field emission sources forming two field emission structures. More specifically, alignment precision may be increased by increasing the number N of field emission sources included within a given surface area A.

In U.S. Pat. No. 7,893,803 issued to Cedar Ridge Research LLC on Feb. 22, 2011, titled "CORRELATED MAGNETIC COUPLING DEVICE AND METHOD FOR USING THE CORRELATED COUPLING DEVICE," a compressed gas system component coupling device is taught that uses the correlated magnet attachment scheme discussed above.

An illustrious example of this coupling device is shown in FIG. 2, which depicts a quick connect air hose coupling 1200 having a female element 1202 and a male element 1204.

The female element 1202 includes a first magnetic field emission structure 1218. The male element 1204 includes a second magnetic field emission structure 1222. Both magnetic field emission structures are generally planar and are in accordance with the same code but are a mirror image of one another. The operable coupling and sealing of the connector components 1202, 1204 is accomplished with sufficient force to facilitate a substantially airtight seal therebetween.

The removal or separation of the male element 1204 from the female element 1202 is accomplished by separating the attached first and second field emission structures 1218 and 1222. The male element is released when the male element is rotated with respect to the female element, which in turn misaligns the first and second magnetic field emission structures.

When conventional magnets are in close proximity, they create a force between them depending on the polarity of their adjacent faces, which is typically normal to the faces of the magnets. If conventional magnets are offset, there is also a shear force toward the alignment position, which is generally small compared to the holding force. However, multipole (coded polymagnets) magnets are different. As multipole magnets are offset, attraction and repulsion forces combine at polarity transitions to partially cancel normal forces while simultaneously establishing stronger shear forces.

FIGS. 3A and 3B depict a simplified graphical depiction of these forces with the arrows indicating the direction of the force exerted on the top magnet. In a conventional setting, the offset reduces the attraction with no significant shear force. The forces are primarily normal to the magnet face, as shown in FIG. 3A. As depicted in the alternating multipole magnet design of FIG. 3B, the combination of attraction and repulsion forces at the polarity transitions reduces holding force and generates a shear force.

In U.S. Pat. No. 8,279,032 (the "'032 Patent") issued to Correlated Magnets Research LLC on Oct. 2, 2012, titled "SYSTEM FOR DETACHMENT OF CORRELATED MAGNETIC STRUCTURES," a system for detaching correlated magnetic structures is taught that uses a multipole polymagnet shear force scheme as discussed above.

An illustrious example is shown in FIG. 45 of the '032 Patent (represented herein as FIG. 4), which depicts complementary codes 4502a, 4502b for polymagnets intended to produce a desirable movement behavior of two magnetic structures 4402a, 4402b.

To achieve the desired movement and shear force requirements, complementary codes 4502a, 4502b are designed that include first portions 4504a, 4504b used to achieve the desired movement behavior and second portions 4506a, 4506b used to increase shear forces, as necessary, to meet desired shear force requirements. The two codes are then used to magnetically program pairs of magnetic structures.

Prior art filter interconnects present numerous technical hurdles, particularly with respect to installation, as well as removal and replacement of the filter cartridge when the filter media has served its useful life. Such technical hurdles include providing effective latching and unlatching mechanisms to retain manually-inserted filter cartridges in mating manifolds after installation, while including mechanisms such as switch-activated valve mechanisms so as to prevent the flow of water when the filter cartridge is removed for replacement. Other technical hurdles include incorporating effective authentication and/or anti-counterfeiting means to ensure that only designated filter cartridges can be installed.

Therefore, a need exists for an improved filter interconnect which overcomes these technical hurdles without substantially increasing the cost and complexity of manufacture.

The present invention adapts the multipole polymagnet technology described above to different schemes of interconnection structures for a filter cartridge and a corresponding manifold to resolve many of the technical hurdles of prior art filter interconnects. It utilizes the shear force generated by the placement of two correlated magnets (coded polymagnets) against each other, initiating a translational motion perpendicular to the direction of attachment between the magnets.

SUMMARY OF THE INVENTION

Bearing in mind the problems and deficiencies of the prior art, it is an object of the claimed invention to provide in a first aspect a filter cartridge for a filtration system, the filter cartridge comprising: a housing having a body, a top surface, a bottom surface, an axial length, and an internal cavity; an ingress port and an egress port in fluid communication with the internal cavity; a protrusion extending radially outwards from the housing body, the protrusion attached to, or integral with, the housing body and proximate the bottom surface; and a magnetic structure located on or within the housing body and having a radially outwardly facing surface; wherein the magnetic structure includes a magnet having a plurality of field emission sources having positions and polarities relating to a predefined spatial force function that corresponds to a predetermined alignment of the field emission sources.

In a second aspect, the claimed invention is directed to a filter manifold configured to receive a filter cartridge, the filter manifold comprising: ingress and egress fluid ports; a sump having an inner cavity for receiving a mating filter cartridge; and a latch housing comprising a latch and a latch blocking mechanism or holder, wherein the latch blocking mechanism includes a magnetic structure therein and a blocking arm, the magnetic structure including a magnet having a plurality of field emission sources having positions and polarities relating to a predefined spatial force function that corresponds to a predetermined alignment of the field emission sources, the latch blocking mechanism movably responsive in a first direction to a magnetic shear force generated when a complementary or paired second magnetic structure is moved in a direction approximately parallel to the first direction and when positioned in close proximity to the magnetic structure; the latch having a pivot axis allowing the latch to pivot radially inwards under a first resilient biasing mechanism; the latch blocking mechanism in slidable communication with the latch and biased towards the latch under a second resilient biasing mechanism applying a force to the latch blocking mechanism or holder, the second resilient biasing mechanism force being approximately parallel to the sump central axis, such that unless acted upon by the magnetic shear force, the latch blocking mechanism blocks the latch from pivoting radially inwards.

In a third aspect, the claimed invention is directed to a filter manifold configured to receive a filter cartridge, the filter manifold comprising: ingress and egress fluid ports; a sump having an inner cavity for receiving a mating filter cartridge; and a latch housing comprising a latch movable in a radial direction with respect to a central axis of the sump and a latch blocking mechanism or holder movable in a direction approximately perpendicular to the radial direction, wherein the latch blocking mechanism includes a first magnetic structure therein, the first magnetic structure including a magnet having a plurality of field emission sources having positions and polarities relating to a predefined spatial force function that corresponds to a predetermined alignment of the field emission sources, the latch blocking mechanism movably responsive in a first direction to a magnetic shear force generated when a complementary or paired second magnetic structure is moved in a direction approximately perpendicular to the first direction and when positioned in close proximity to the first magnetic structure; the latch movable radially inwards under a first resilient biasing mechanism; the latch blocking mechanism in slidable communication with the latch and movable towards the latch under a second resilient biasing mechanism applying a force to the latch blocking mechanism or holder, the second resilient biasing mechanism force being approximately perpendicular to the sump central axis, such that unless acted upon by the shearing magnetic force, the latch blocking mechanism blocks the latch from moving radially inwards.

In a fourth aspect, the claimed invention is directed to a filter manifold configured to receive a filter cartridge, the filter manifold comprising: ingress and egress fluid ports; a sump having an inner cavity for receiving a mating filter cartridge; and a latch housing comprising a latch and a latch blocking mechanism or holder, wherein the latch blocking mechanism includes a first magnetic structure therein and a blocking arm, the first magnetic structure including a magnet having a plurality of field emission sources having positions and polarities relating to a predefined spatial force function that corresponds to a predetermined alignment of the field emission sources, the latch blocking mechanism movably responsive in a first direction to a magnetic shear force generated when a complementary or paired second magnetic structure is moved in a direction approximately parallel to the first direction and when positioned in close proximity to the first magnetic structure; the latch translatable radially inwards under a first resilient biasing mechanism; the latch blocking mechanism in slidable communication with the latch and biased towards the latch under a second resilient biasing mechanism applying a force to the latch blocking mechanism or holder, the second resilient biasing mechanism force being approximately parallel to the sump central axis, such that unless acted upon by the magnetic shear force, the latch blocking mechanism blocks the latch from translating radially inwards.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

FIG. 13 shows the latch holder in its home position;

FIG. 14 depicts a partial perspective view of the vertical side latch configuration when the magnets in the cartridge housing and the latch holder align, such that the latch holder and mechanical blocking arm move longitudinally downwards;

FIG. 15 depicts a partial perspective view of the vertical side latch configuration when the magnets generate a shearing force with one another, removing the mechanical blocking arm from holding latch, and allowing latch to rotate or pivot radially inwards in the direction of arrow 40;

FIG. 28 depicts a side, plan view of an exemplary filter interconnect utilizing coded polymagnets to move a blocking mechanism or position stop to allow for proper filter cartridge installation in a mating manifold, and more particularly, polymagnets coded to generate sufficient shear force to move the blocking mechanism or position stop when the polymagnets are in a desired alignment and proximity;

FIG. 29 depicts a top, cross-sectional view of the filter interconnect of FIG. 28;

FIGS. 30A-30F depict the filter cartridge of FIGS. 28 and 29 being inserted into its mating manifold, showing the filter magnet and manifold magnet moving from a first relative position to a second relative position and allowing for proper installation of the filter cartridge;

DESCRIPTION OF THE EMBODIMENT(S)

Figure 1:
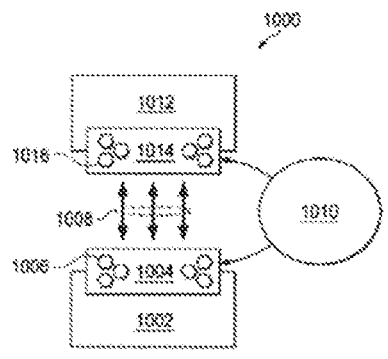
FIG. 1 depicts an apparatus of the prior art having two components magnetically attached to one another.
Figure 2:
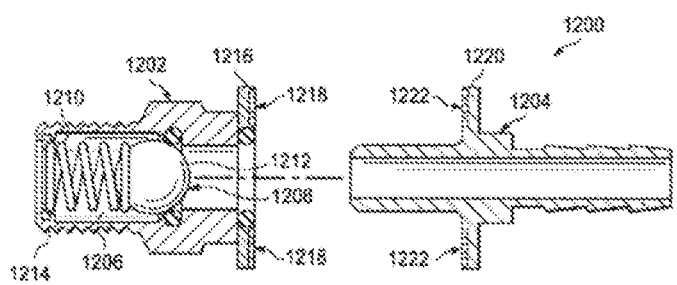
FIG. 2 depicts a quick connect air hose coupling of the prior art showing placement of correlated magnets for attachment.
Figure 3A:
FIGS. 3A and 3B depict exemplary complementary codes for polymagnets of the prior art intended to produce a desirable movement behavior of two magnetic structures.
Figure 3B:
Figure 4:
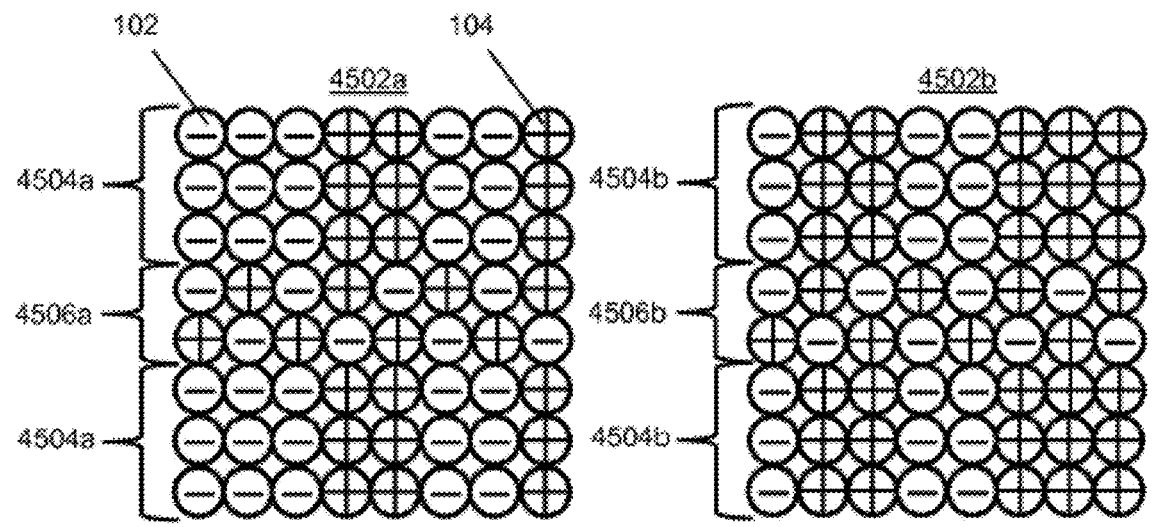
FIG. 4 depicts an illustrious example of complementary codes for polymagnets intended to produce a desirable movement behavior of two magnetic structures.

In describing the embodiments of the present invention, reference will be made herein to FIGS. 1-45 of the drawings in which like numerals refer to like features of the invention.

Certain terminology is used herein for convenience only and is not to be taken as a limitation of the invention. For example, words such as "upper", "lower", "left", "right", "horizontal", "vertical", "upward", "downward", "clockwise", or "counterclockwise" merely describe the configuration shown in the drawings. Indeed, the referenced components may be oriented in any direction and the terminology, therefore, should be understood as encompassing such variations unless specified otherwise. For purposes of clarity, the same reference numbers may be used in the drawings to identify similar elements.

Additionally, in the subject description, the word "exemplary" is used to mean serving as an example, instance or illustration. Any aspect or design described herein as "exemplary" is not necessarily intended to be construed as preferred or advantageous over other aspects or design. Rather, the use of the word "exemplary" is merely intended to present concepts in a concrete fashion.

Correlated magnets contain areas of alternating poles. These patterns of alternating poles can concentrate and/or shape magnetic fields to give matching pairs of magnets unique properties. The present invention utilizes correlated magnet designs with "high auto-correlation and low cross-correlation" which is a characteristic of correlated magnets which only achieve peak efficacy (magnet attraction or repulsion) when paired with a specific complementary magnet. An example of such use of correlated magnets is disclosed in U.S. Pat. No. 8,314,671 issued to Correlated Magnets Research LLC on Nov. 20, 2012, entitled "KEY SYSTEM FOR ENABLING OPERATION OF A DEVICE." Correlated magnets are also characterized by dense and tunable magnetic fields, allowing for specifically engineered force curves with higher force at shorter working distances.

The present invention utilizes multipole polymagnets, such as alignment polymagnets, which are pairs of multipole magnets with a defined correlation in the codes that describe their polarity regions. As the relative position of the magnets is changed, particularly the linear offset of the magnets, the interaction between the polarity regions on the magnets creates different net holding force (normal to the magnet faces) and shear force (parallel to the faces). Because of the correlation properties of these codes, they have strong forces when they are relatively close to alignment but weak forces elsewhere. This allows the design of systems where the magnetic forces can largely be neglected until the magnets have a relatively low offset from their alignment position.

These characteristics give better working range, reduced possibility of misalignment, and improved user experience.

Figure 5:
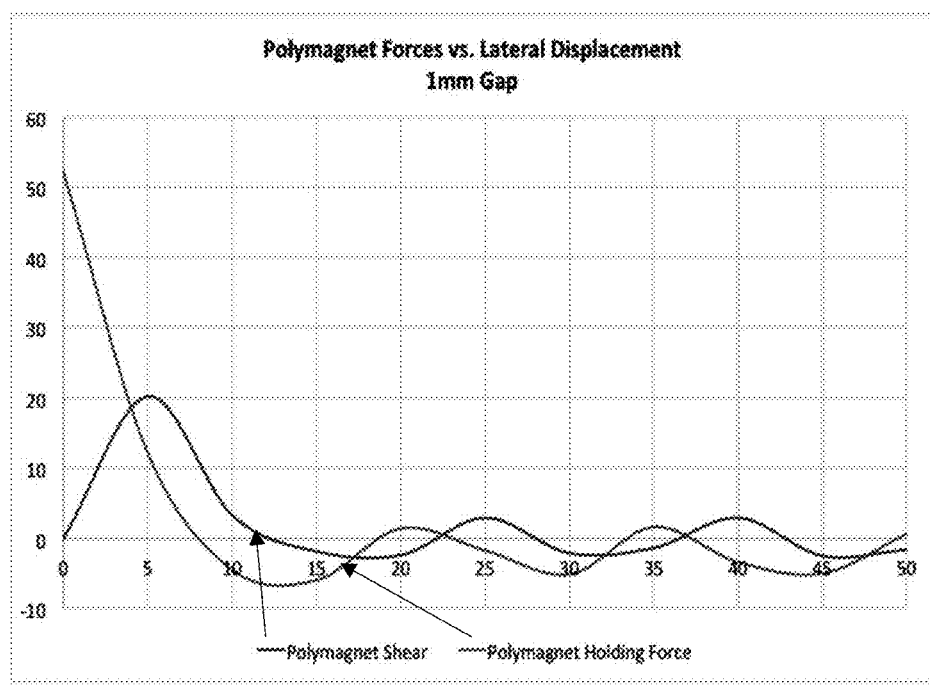
FIG. 5 depicts a graph of polymagnet forces versus lateral displacement, where a positive holding force represents attraction and a positive shear force represents a force toward an aligned position.

Alignment polymagnets can be designed to have varying magnetic forces depending on the relative lateral offset, as illustrated in the graph of FIG. 5, where a positive holding force represents attraction, and a positive shear force represents a force toward the aligned position.

Figure 6:
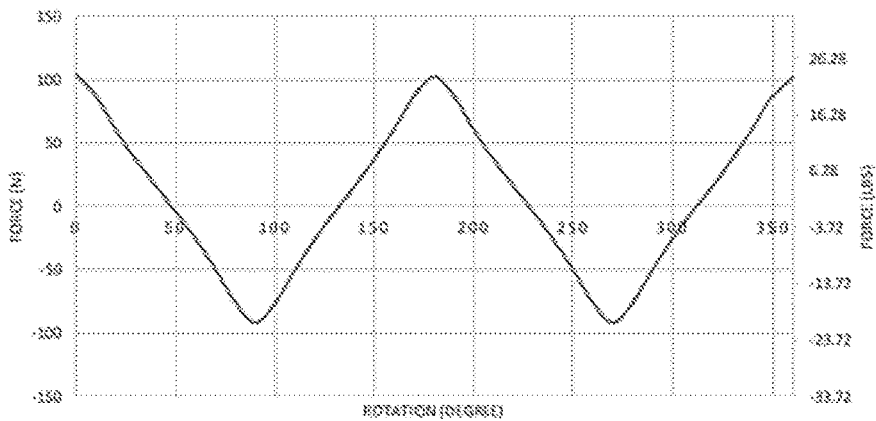
FIG. 6 depicts varying magnetic forces of correlated magnets depending on the relative rotational orientation of the pair of magnets (e.g., repulsion-attraction-repulsion-attraction at 90-degree intervals) shown for a 0.5 mm magnet-to-magnet gap.

In addition, correlated magnets can be designed to have varying magnetic forces depending on the relative rotational orientation of the pair of magnets (e.g., repulsion-attraction-repulsion-attraction at 90-degree intervals) at a 0.5 mm magnet-to-magnet gap, as illustrated in the graph of FIG. 6.

Integral to the design is a matching set of "keyed" correlated magnets disposed in/on the filter cartridge housing and manifold, respectively, which provide the initial drive to engage functions through non-electric and non-contacting actuation. As discussed further herein, the embodiments of the present invention illustrate the actuation of a latching mechanism that allows for securing a filter cartridge to a manifold, and may further include the actuation of a valve for water flow when the filter cartridge is secured to the manifold, or the engagement of other mechanisms upon interconnection; however, it should be understood by those skilled in the art that these types of actuations are only examples of how a magnetic shear force mechanism can be implemented in a filter cartridge/manifold application, and that other magnetic shear force applications to secure a filter cartridge to a manifold are not precluded.

The present invention employs embodiments that utilize magnetic designs that encompass correlated magnets. The function of the correlated magnets in this application is twofold. First, a filter cartridge having a correlated magnet is inserted within a receiving manifold having a complementary correlated magnet. At some point during the interconnection, either during filter cartridge insertion or rotation within the manifold, a magnetic shear force is generated that causes translation of a movable component or structure having an attached complementary correlated magnet in a direction perpendicular to the direction of rotation or insertion. Second, the magnetic shear force introduced by the rotation or insertion of the filter cartridge acts upon a latching mechanism, a valve or switch, or some other engagement mechanism. In the case of a latching mechanism, the latching device is manipulated in motion to secure the filter cartridge to the manifold, prohibiting the filter from disengagement until a release mechanism is deployed.

As noted above, a magnetic shear force is generated by a complementary pair of correlated magnets, and applied to a filter interconnection system, which allows for a higher degree of control and flexibility over the timing, attachment, and actuation of critical components and system functions.

This is accomplished by having a pair of magnets, preferably correlated magnets, oriented parallel to one another on each component of the connecting pair, wherein a first magnet is disposed on a filter cartridge and a complementary magnet is located on the manifold designed to secure the filter into position. It should be understood by those skilled in the art that a "correlated magnet" or "polymagnet" as referred to herein may comprise a single magnet with a plurality of polarity regions or alternatively may comprise multiple magnets arranged to create a polarity pattern with the desired characteristics. In at least one embodiment, a thin layer of material may be introduced, physically separating the two magnets so they cannot have physically contacting surfaces, but they can still magnetically communicate with one another when in a desired operating proximity.

In the embodiments described herein, when a correct set of "keyed" or "coded" magnets are aligned and brought into an effective working distance, the result is a shear force generated between the two magnets. The magnet disposed on the filter cartridge is fixed; however, the corresponding manifold magnet is permitted to translate linearly, or in some instances radially, with respect to the longitudinal axis of the filter cartridge, as a result of the shear force acting on the moveable mechanical components of the manifold. The function of the magnet located on the manifold is to assist in actuating a latching mechanism and/or actuating a valve (e.g., spool valve, cam, poppet valve, and other valve types) normally biased to the closed position. As will be described in more detail below, the force curves of the latching mechanism and correlated magnet couple are engineered such that only a set of corresponding "keyed" or "coded" magnets will provide sufficient magnetic shear force to overcome the force maintaining the complementary mechanical components of the manifold in their initial position.

In some embodiments, the shear force generated when the set of "keyed" or "coded" magnets are aligned and brought into an effective working distance results in the movement and actuation of a latching mechanism, which if not activated would not secure the filter cartridge, and would allow the cartridge to dislodge from the manifold under pressure from the ingress water. During installation, the filter cartridge may be guided by an alignment rib on the cartridge into a corresponding alignment track on the filter manifold. A latching mechanism and manifold magnet integral with or mounted thereon are normally biased in an open position to allow for easy insertion of a filter cartridge, but are linearly or radially translatable about the filter manifold to allow for the latching mechanism to move and hold or secure the filter cartridge within the manifold once the filter cartridge is fully inserted, thus providing a counter force to the extraction force (water pressure) acting upon the filter cartridge.

A corresponding polymagnet is disposed on the filter cartridge (filter magnet), such that when the filter cartridge is inserted into the manifold receiving cavity, the keyed or coded polymagnets become aligned when in proximity (in-phase generating a shear force), resulting in a shear force strong enough to physically move the mechanical latching components on the manifold, causing the latching mechanism to be placed in a position that locks the filter cartridge in place, thus securing attachment of the filter cartridge to the manifold.

It should be understood by those skilled in the art that the embodiments of the present invention described herein, which utilize polymagnets coded to generate a magnetic shear force are only exemplary designs for incorporating coded polymagnets to an interconnection structure for a filter cartridge and a corresponding manifold, and that the direct or indirect actuation of a valve or blocking mechanism may alternatively be achieved through polymagnets coded for magnetic attraction or repulsion.

Vertical Side Latch

Figure 7:
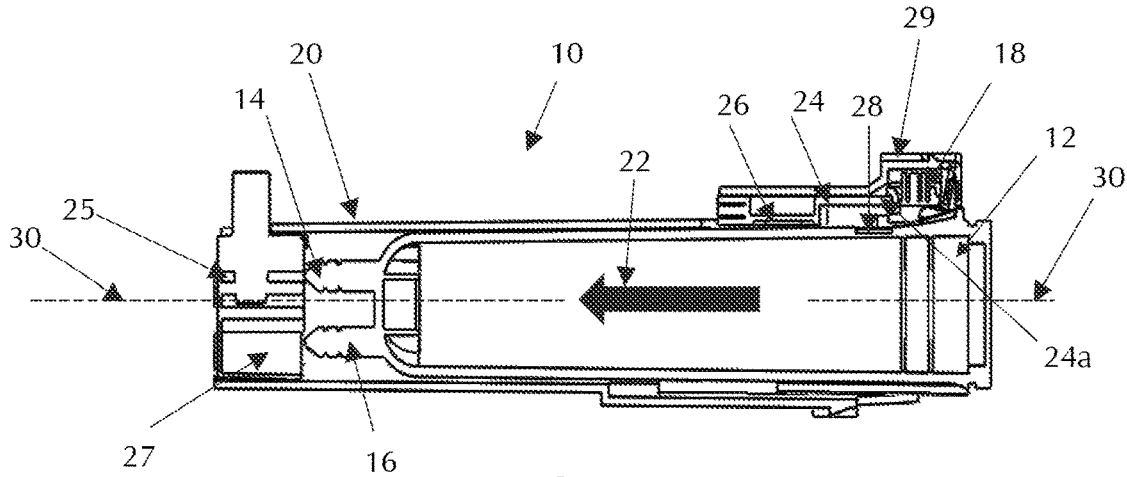
FIG. 7 depicts a vertical side latch embodiment of the present invention where a filter/manifold assembly with a filter cartridge not yet installed is being inserted into a manifold sump.

One embodiment utilizing magnetic shear forces introduces a vertical side latch to secure the filter cartridge to the manifold sump. FIG. 7 depicts a filter/manifold assembly 10 with a filter cartridge 12 not yet fully installed, but being inserted into sump 20 in the direction of the arrow 22 as shown, which is defined as the longitudinal or axial direction of the filter assembly, as denoted by longitudinal axis 30.

In FIG. 7, the ingress/egress ports 14, 16 are not yet engaged with the receiving manifold ports 25, 27, and a bypass valve (not shown) for fluid flow is not yet activated.

Latch housing 29 houses latch 18 and slidable latch holder 24. Latch 18 is held in place by a mechanical blocking arm 24a of latch holder 24. Latch holder 24 includes a coded magnet 26 either attached thereto or embedded therein. The slideable latch holder 24 is designed to move relative to the manifold sump 20 in the direction of longitudinal axis 30. In a non-filtering position, when the filter cartridge is either not inserted or partially inserted within the sump (as depicted in FIG. 7), the mechanical blocking arm 24a of latch holder 24 is situated in a position in the manifold at its furthest distance from the ingress/egress manifold ports 25, 27, proximate the sump opening. In this position, mechanical blocking arm 24a abuts and holds latch 18 from any movement or pivoting radially inwards towards filter cartridge 12 and the center of manifold sump 20.

Figure 8:
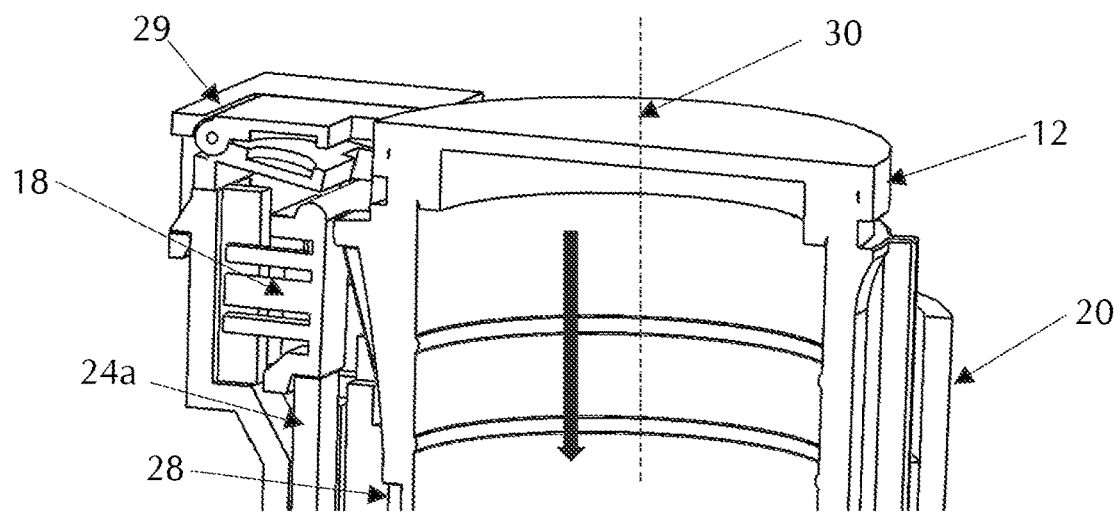
FIG. 8 depicts an exploded view of the filter assembly of FIG. 7 during insertion of the filter cartridge.

FIG. 8 depicts an exploded view of the filter assembly 10 of FIG. 7. Filter cartridge 12 is being inserted within manifold sump 20 in the direction of the arrow and parallel to longitudinal axis 30. Coded magnet 28 secured to, or embedded within, the outer surface of filter cartridge 12 is located on the cartridge such that upon complete insertion it remains in close proximity to latch housing 29 and the coded magnet 26 (not shown) on mechanical blocking arm 24a. Until the filter cartridge is inserted, latch 18 remains held by mechanical blocking arm 24a from pivoting radially inwards towards filter cartridge 12.

Figure 9:
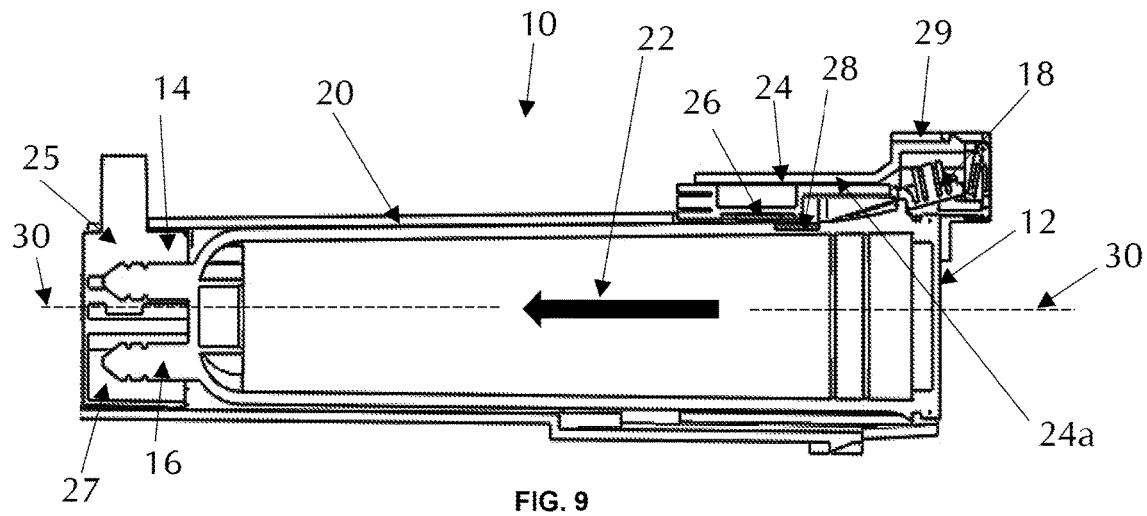
FIG. 9 depicts a cross-sectional view of the filter/manifold assembly of FIG. 7 when the filter cartridge is fully installed within the manifold sump, and ingress/egress ports are fully engaged.

FIG. 9 depicts a cross-sectional view of the filter/manifold assembly 10 of FIG. 7 when filter cartridge 12 is fully installed within sump 20. Ingress/egress ports are fully engaged. Filter cartridge 12 coded magnet 28 is in close enough proximity to manifold coded magnet 26 as to be in magnetic communication with one another. This close proximity establishes a magnetic shear force between the two magnets that forces the coded magnet 26 in the latch holder 24, and thus the latch holder itself, to move towards the ingress/egress ports 25, 27 of the manifold, in the direction of arrow 22.

Figure 10:
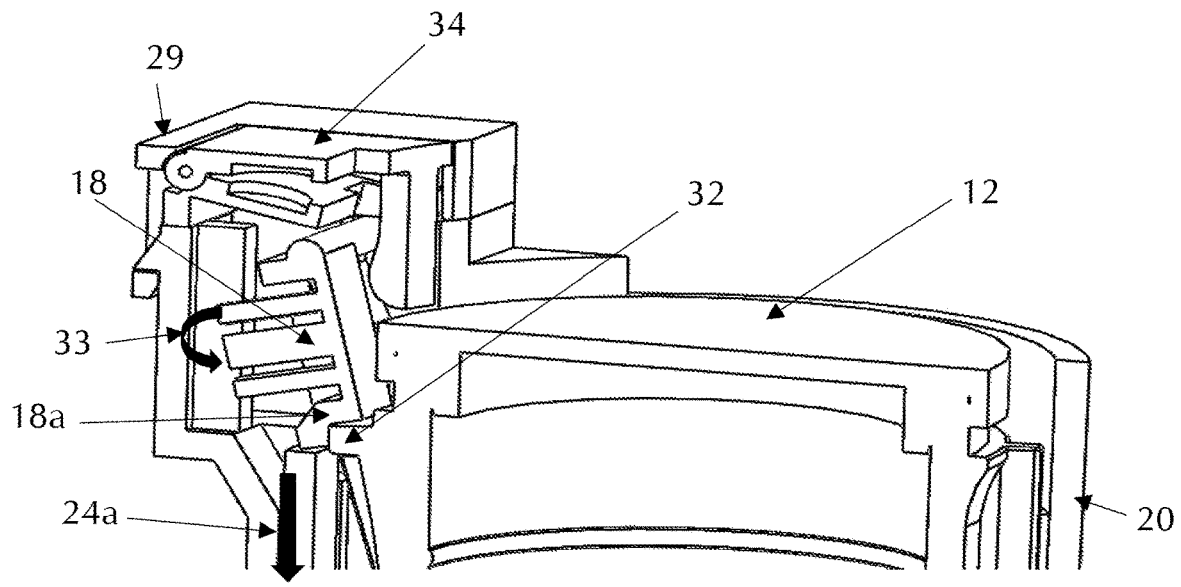
FIG. 10 depicts a partial cross-sectional view of the latching end of the filter cartridge/manifold assembly for the full insertion connection configuration shown in FIG. 9.

This action shifts the mechanical blocking arm 24a away from latch 18, which allows latch 18 to pivot radially inwards towards filter cartridge 12. FIG. 10 depicts a partial cross-sectional view of the latching end of the filter cartridge/manifold assembly 10 for the full insertion connection configuration shown in FIG. 9.

Filter cartridge 12 includes a lip or protrusion 32 extending radially outwards towards latch housing 29. Upon insertion of filter cartridge 12 into sump housing 20, the mechanical blocking arm 24a will traverse under magnetic shear force in the direction of insertion of the filter cartridge removal and the longitudinally directed arrow. As depicted in FIG. 10, once latch 18 is cleared of mechanical blocking arm 24a, latch 18 will pivot radially inwards toward filter cartridge 12 in the direction of arrow 33. Latch 18 moves under a biased resilient force, such as that provided by a spring or other resilient structure.

Latch 18 includes a notch or seat 18a which moves into position to secure protrusion 32 and prevent filter cartridge 12 from exiting sump 20. Notch or seat 18a remains in contact with protrusion 32 and prohibits an extraction movement of the filter cartridge.

Figure 11:
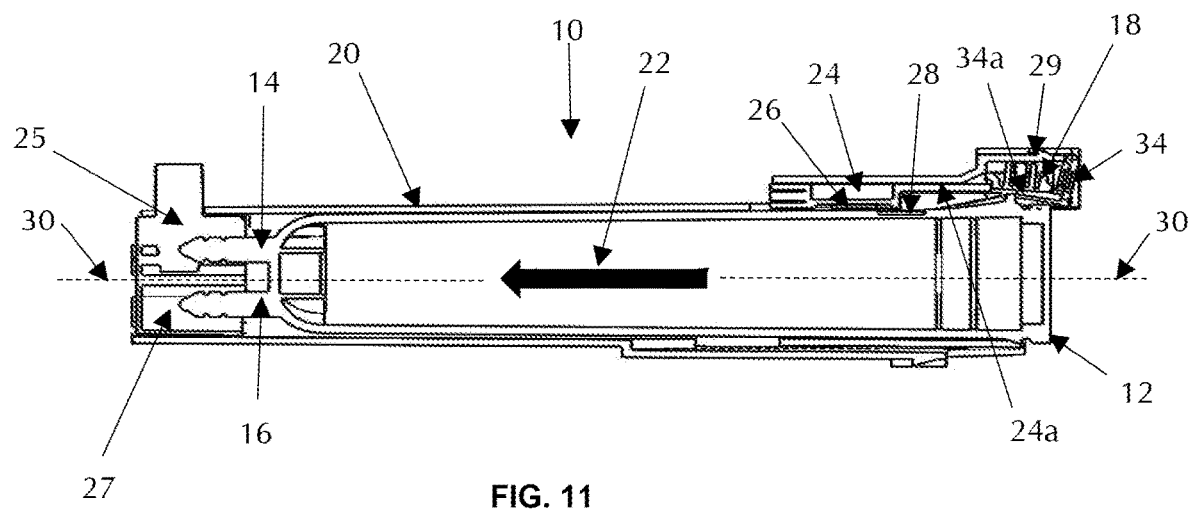
FIG. 11 depicts the configuration of the filter cartridge/manifold assembly of FIG. 7 in a partial release mode, when a user begins to activate a release lever.

In order to release the filter cartridge 12 from sump 20, it is necessary to remove latch 18 from securing the filter cartridge. This is accomplished by a manually activated release lever or button 34. FIG. 11 depicts the configuration of the filter cartridge/manifold assembly 10 in a partial release mode, when a user begins to activate release lever 34.

In one embodiment, release lever 34 rotates on a pivot axis based on compression by the user in a direction of arrow 22. Release lever arm 34a pivots latch 18 radially outwards, removing notch or seat 18a from interacting with protrusion 32. As filter cartridge 12 is removed from sump 20, latch holder 24 moves back to its initial position in a direction opposite arrow 22 under a resilient bias force, such as that provided by a spring.

Figure 12:
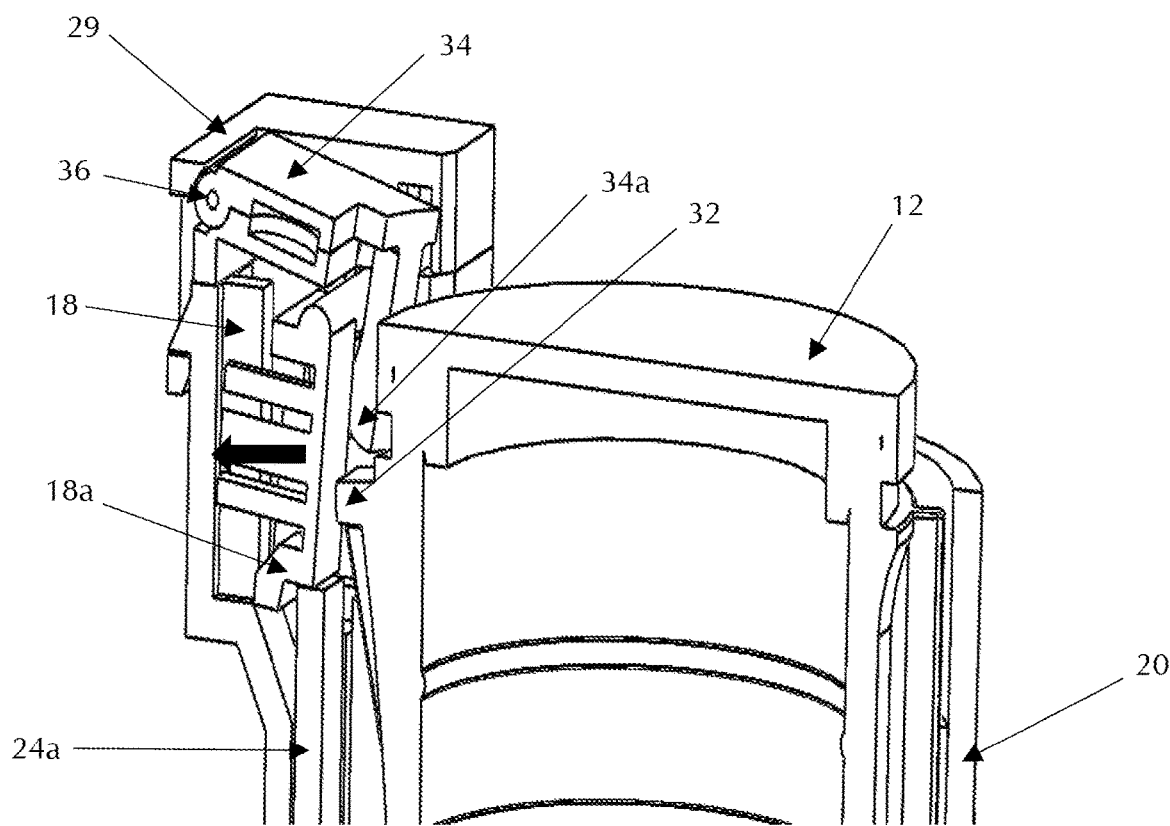
FIG. 12 depicts a partial cross-sectional view of the partial extraction configuration of FIG. 11.

FIG. 12 depicts a partial cross-sectional view of the partial extraction configuration of FIG. 11. Latch 18 is shown in its filter cartridge unlocked position, being partially interrupted and pushed by release lever arm 34a through the compression of release lever 34 by a user. As release lever 34 pivots about axis 36, latch 18 moves radially outwards away from filter cartridge 12, which in turn moves mechanical blocking arm 24a upwards towards latch 18 to block latch 18 from pivoting radially inwards under its biasing force. Filter cartridge 12 can then be removed from sump 20.

A method of interconnecting a filter cartridge and a mating filter manifold as depicted in FIGS. 7-12, includes the following steps: a) inserting the filter cartridge into a sump of the mating filter manifold, the filter cartridge comprising a housing having a body, a bottom surface, a protrusion extending radially outwards from the housing body, the protrusion attached to, or integral with, the housing body and proximate the bottom surface, and a first magnetic structure located on or within the housing body and having a radially outwardly facing surface, the first magnetic structure including a magnet having a plurality of field emission sources having positions and polarities relating to a predefined spatial force function that corresponds to a predetermined alignment of the field emission sources; b) moving the filter cartridge within the filter manifold sump in a first direction; c) aligning the first magnetic structure plurality of field emission sources with a plurality of magnetic field emission sources of a complementary or paired second magnetic structure disposed within a latch blocking mechanism or holder of the filter manifold such that a magnetic shear force is generated, the latch blocking mechanism in slidable communication with a latch having a pivot axis allowing the latch to pivot radially inwards under a first resilient biasing mechanism and the latch blocking mechanism being biased toward the latch under a second resilient biasing mechanism applying a force to the latch blocking mechanism or holder, the second resilient biasing mechanism force being approximately parallel to the sump central axis; d) moving the latch blocking mechanism away from the latch in response to the magnetic shear force; and e) pivoting the latch radially inwards to contact the filter cartridge protrusion, thereby securing the filter cartridge to the manifold.

Figure 13:
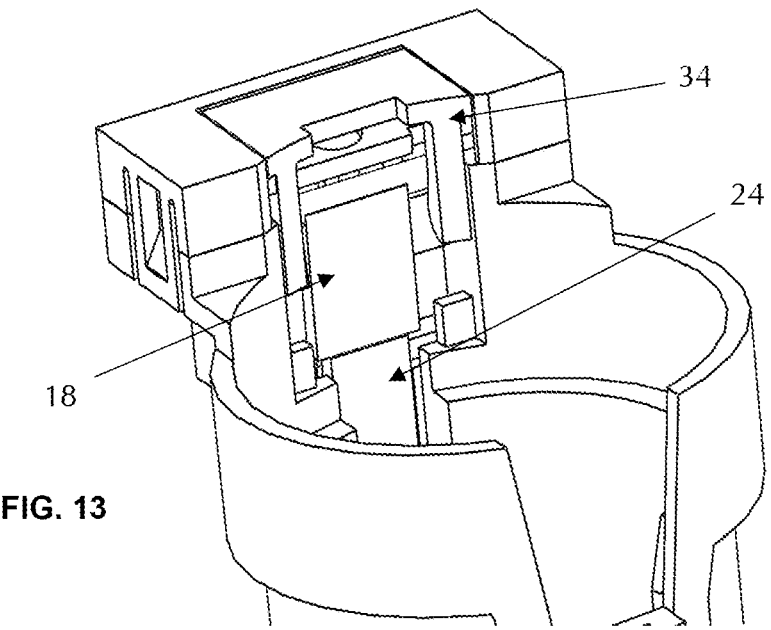
FIGS. 13-15 depict a partial perspective views of the vertical side latch configuration.
Figure 14:
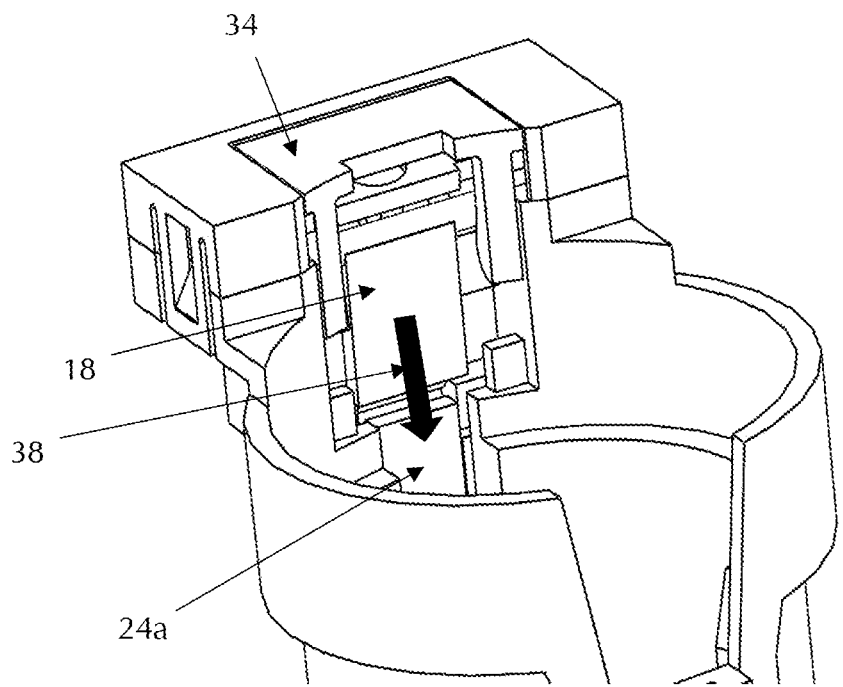
Figure 15:
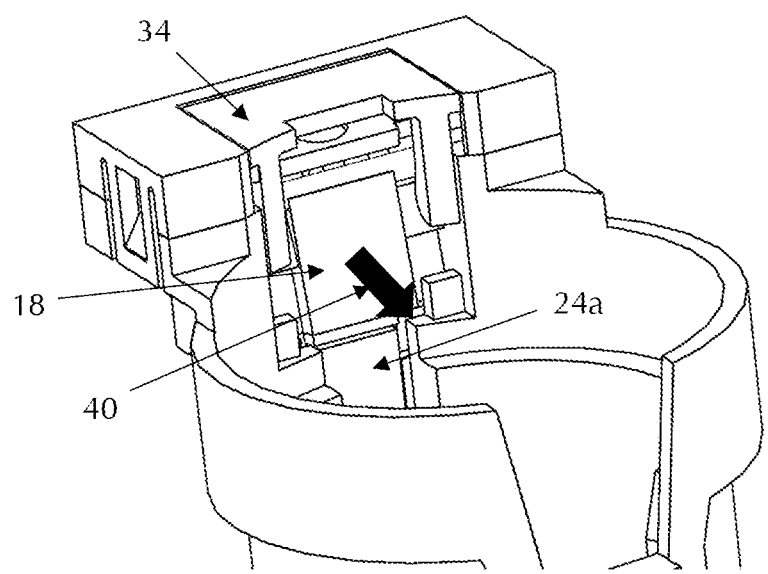

FIGS. 13-15 depict a partial perspective views of the vertical side latch configuration. FIG. 13 shows the latch holder 24 in its home position. If there is no magnetic interaction between latch holder 24 and latch 18, latch 18 remains unmoved, and a filter cartridge would not be able to be locked into place insomuch as there would be no latch to hold the filter cartridge within the sump.

FIG. 14 depicts a partial perspective view of the vertical side latch configuration when the magnets in the cartridge housing and the latch holder align, such that the latch holder 24 and mechanical blocking arm 24a move longitudinally downwards in the direction of arrow 38. This occurs when the filter cartridge is inserted within the sump; however, for demonstrative purposes, the filter cartridge is not shown in FIGS. 13-15.

FIG. 15 depicts a partial perspective view of the vertical side latch configuration when the magnets generate a shearing force with one another, removing the mechanical blocking arm 24a from holding latch 18, and allowing latch 18 to rotate or pivot radially inwards in the direction of arrow 40 towards the center of the sump, securing the filter cartridge.

Horizontal Rail Side Latch

Figure 16:
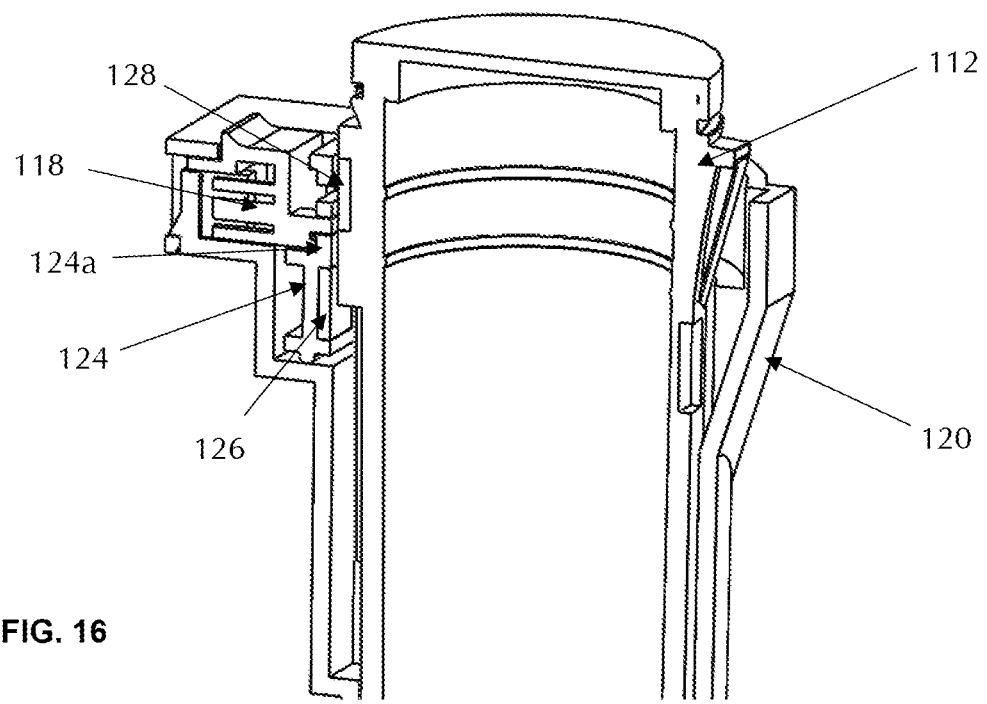
FIG. 16 depicts a partial cross-sectional view of a horizontal side latch configuration for securing a filter cartridge to a manifold utilizing correlated, coded magnetic shear forces.

FIG. 16 depicts a partial cross-sectional view of a horizontal side latch configuration for securing a filter cartridge to a manifold utilizing correlated, coded magnetic shear forces. In this embodiment, magnetic holder 124 is shown in the home position as filter cartridge 112 is being inserted into sump 120; however, filter cartridge 112 is not fully inserted, and at this point there is no magnetic communication between the manifold coded magnet 126 and the filter cartridge coded magnet 128. Filter cartridge coded magnet 128 is housed within or attached to the cartridge housing itself, while manifold coded magnet 126 may be secured in latch holder 124 or designed such that it acts as a latch holder itself.

Figure 17:
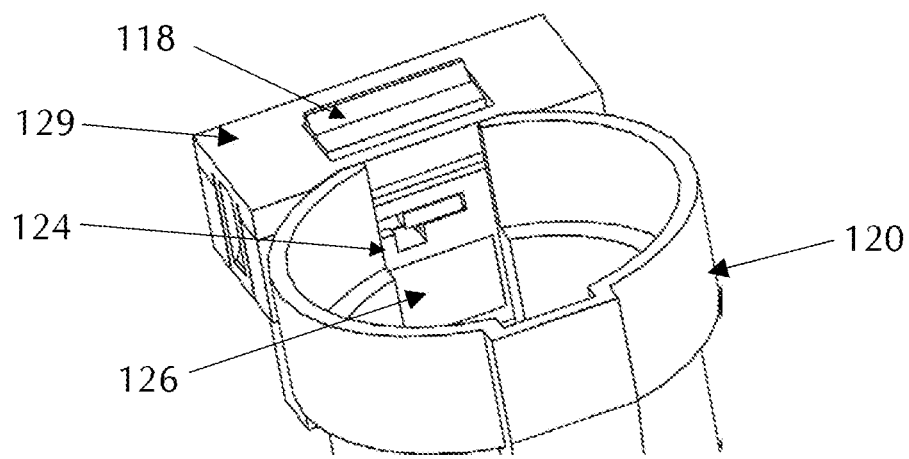
FIG. 17 depicts a partial perspective view of the horizontal rail side latch configuration of FIG. 16, where the magnetic holder is shown in the home position, keeping the latch from moving radially inwards.

FIG. 17 depicts a partial perspective view of the horizontal rail side latch configuration of FIG. 16, where the magnetic holder 124 is shown in the home position, keeping latch 118 from moving radially inwards. Latch housing 129 holds latch 118 adjacent the sump 120.

Figure 18:
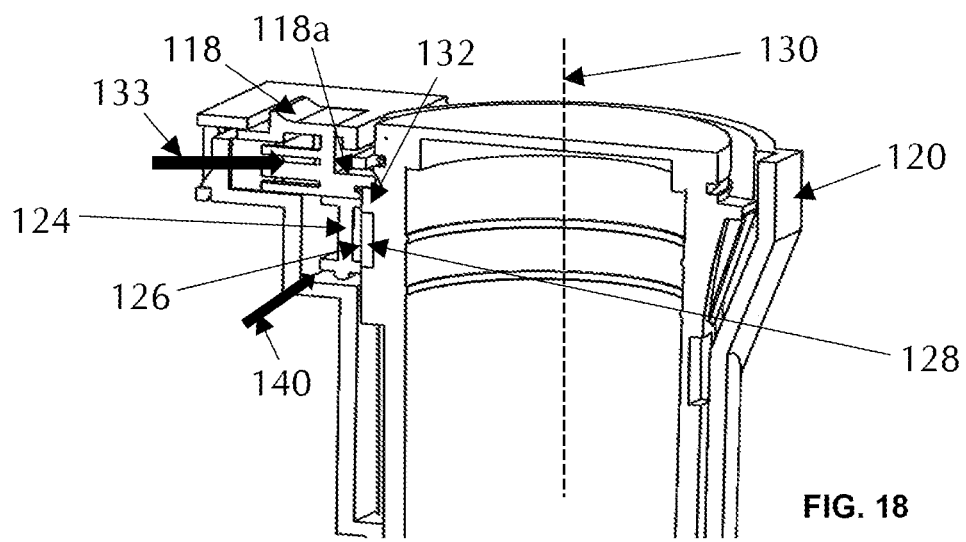
FIG. 18 depicts a partial, perspective, cross-sectional view of the horizontal rail side latch configuration showing the coded magnets in alignment when a filter cartridge (not shown) is installed.

FIG. 18 depicts a partial, perspective, cross-sectional view of the horizontal rail side latch configuration showing the coded magnets 126, 128 in alignment when a filter cartridge (not shown) is installed. This alignment causes magnet holder 124 to shear to the side in the direction of arrow 140. The "vertical" movement of magnet holder 124 (parallel to central longitudinal axis 130) permits latch 118 to move radially inwards in the direction of arrow 133, which in turn extends latch arm 118a towards filter cartridge 112. Latch arm 118a seats adjacent filter cartridge protrusion or detent 132, prohibiting filter cartridge 112 from removal, securing the filter cartridge in place.

Figure 19:
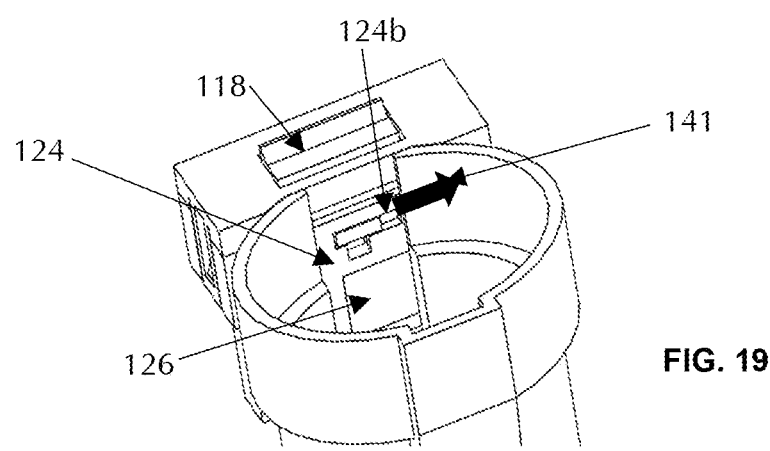
FIG. 19 depicts a partial, perspective, cross-sectional view of the horizontal rail side latch configuration of FIG. 18 where the coded magnets are aligned and the magnet holder is displaced to one side under a magnetic shear force.

FIG. 19 depicts a partial, perspective, cross-sectional view of the horizontal rail side latch configuration of FIG. 18 where the coded magnets are aligned and the magnet holder 124 is displaced to one side in the direction of arrow 141, perpendicular to central axis 130, under a magnetic shear force. At this juncture, latch 118, which is biased under a resilient force in a direction radially inwards, extends through an aperture or slot 124b towards the inside of the sump where the filter cartridge (not shown) would be placed.

Figure 20:
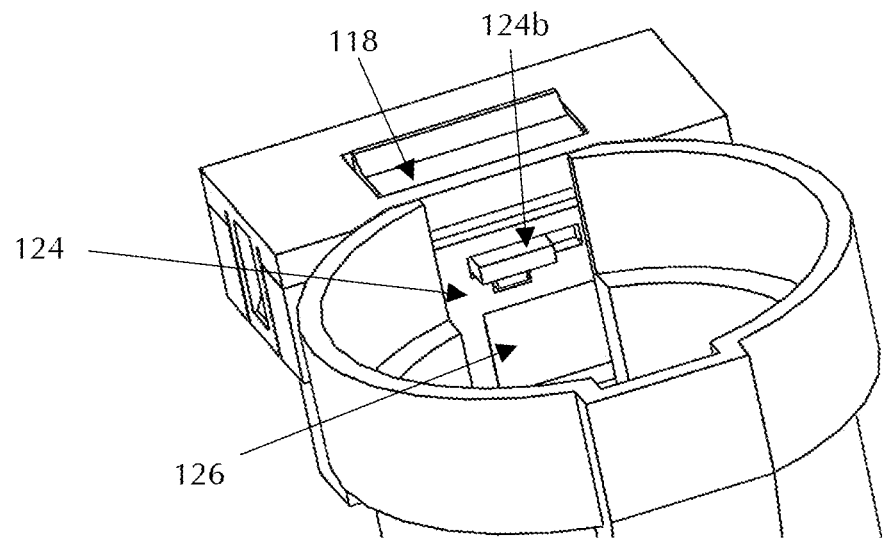
FIG. 20 depicts a partial, perspective, cross-sectional view of the horizontal rail side latch configuration of FIG. 18 showing when magnet holder moves under a magnetic shearing force, latch moves under a biasing resilient force, and the latch is able to extend and move forward to secure the filter cartridge (not shown)
Figure 21:
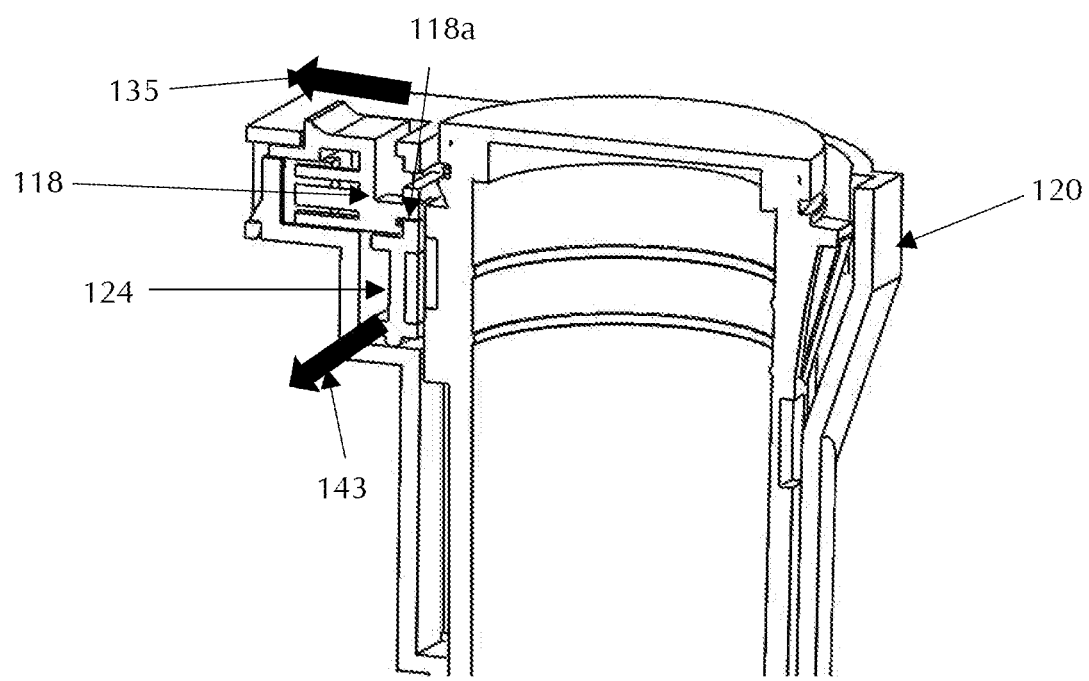
FIG. 21 depicts a partial, perspective, cross-sectional view of the horizontal rail side latch configuration during the release stage, where a user pushes back the latch against a biasing resilient force, moving the latch arm radially outwards, thus allowing the magnet holder under its own resilient biasing force to return to its initial position, blocking the latch arm from extending radially inwards.

FIG. 20 depicts a partial, perspective, cross-sectional view of the horizontal rail side latch configuration of FIG. 19 showing when magnet holder 124 moves under a magnetic shearing force, latch 118 moves under a biasing resilient force, and the latch is able to extend and move forward to secure the filter cartridge (not shown);

FIG. 21 depicts a partial, perspective, cross-sectional view of the horizontal rail side latch configuration during the release stage, where a user pushes back the latch 118 in the direction of arrow 135 against a biasing resilient force, moving the latch arm 118a radially outwards, thus allowing magnet holder 124 under its own resilient biasing force to return to its initial position in the direction of arrow 143, blocking latch arm 118a from extending radially inwards. In this manner, the biased magnet holder is allowed to move to hold back the latch arm 118a which would otherwise extend radially inwards.

It should be noted that latch 118 may have a latch arm 118a that includes a predetermined geometric shape, such as a protruding segment having a circular, square, rectangular, oval, elliptical, or other cross-sectional shape, and the receiving filter cartridge detent 132 may include a complementary shaped receiving aperture.

A method of interconnecting a filter cartridge and a mating filter manifold as delineated in FIGS. 16-21 may include the following method steps: a) inserting the filter cartridge into a sump of the mating filter manifold, the filter cartridge comprising a housing having a body, a bottom surface, a protrusion extending radially outwards from the housing body, the protrusion attached to, or integral with, the housing body and proximate the bottom surface, and a first magnetic structure located on or within the housing body and having a radially outwardly facing surface, the first magnetic structure including a magnet having a plurality of field emission sources having positions and polarities relating to a predefined spatial force function that corresponds to a predetermined alignment of the field emission sources; b) moving the filter cartridge within the filter manifold sump in a first direction; c) aligning the first magnetic structure plurality of field emission sources with a plurality of magnetic field emission sources of a complementary or paired second magnetic structure disposed within a latch blocking mechanism or holder of the filter manifold such that a magnetic shear force is generated, the latch blocking mechanism in slidable communication with a latch translatable under a first resilient biasing mechanism in a radial direction with respect to a central axis of the sump and the latch blocking mechanism being biased toward the latch under a second resilient biasing mechanism applying a force to the latch blocking mechanism or holder, the second resilient biasing mechanism force being approximately perpendicular to the sump central axis; d) moving the latch blocking mechanism away from the latch in a direction approximately perpendicular to the radial direction in response to the magnetic shear force; and e) translating the latch radially inwards to contact the filter cartridge protrusion, thereby securing the filter cartridge to the manifold.

Vertical Rail Side Latch

Figure 22:
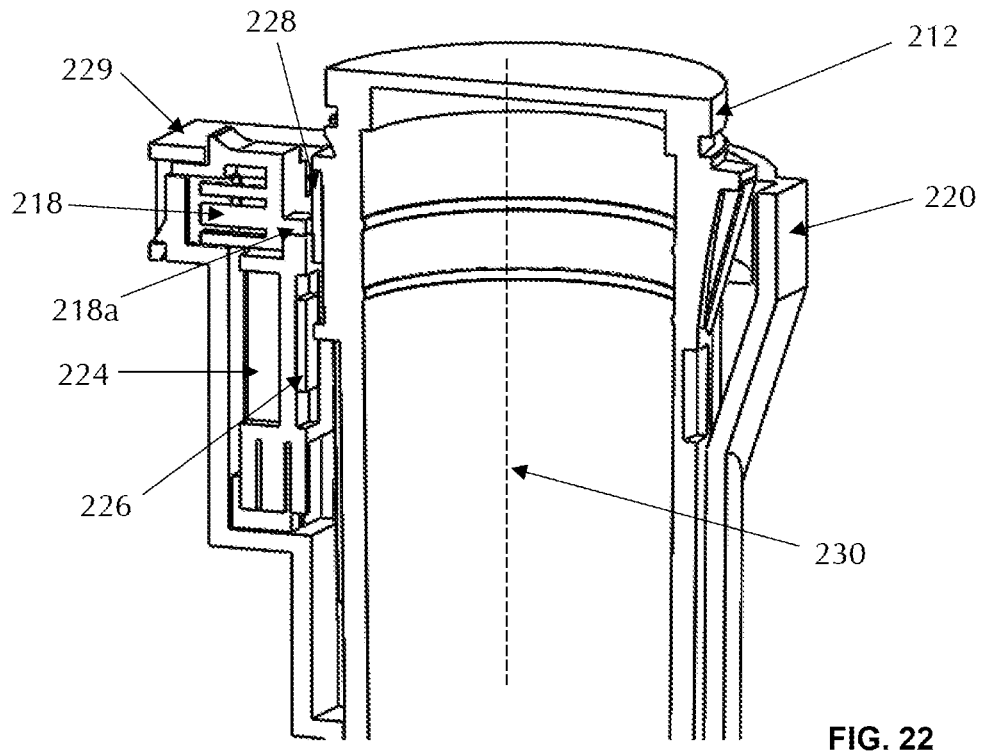
FIG. 22 depicts a partial cross-sectional view of a vertical rail side latch configuration for securing a filter cartridge to a manifold utilizing correlated, coded magnetic shear forces.

FIG. 22 depicts a partial cross-sectional view of a vertical rail side latch configuration for securing a filter cartridge to a manifold utilizing correlated, coded magnetic shear forces. In this embodiment, magnetic holder 224 is shown in the home position as filter cartridge 212 is being inserted into sump 220; however, filter cartridge 212 is not fully inserted, and at this point there is no magnetic communication between the manifold coded magnet 226 and the filter cartridge coded magnet 228. Unlike the previous embodiment described, a vertical rail side latch configuration presents a magnetic shearing force that causes the latch holder 224 to move in a vertical, longitudinal direction, parallel to central axis 230. Filter cartridge coded magnet 228 is housed within or attached to the cartridge housing, while manifold coded magnet 226 is either secured in latch holder 224 or acts alone as a latch holder, which is then housed in latch housing 229. If there were no magnet on the filter cartridge, latch holder 224 would not move from its initial home position, and would therefore prohibit latch 218 from moving radially inwards towards the sump central axis. In this manner, a magnetless cartridge could not be secured to the sump, and would most likely exit under applied water pressure.

Figure 23:
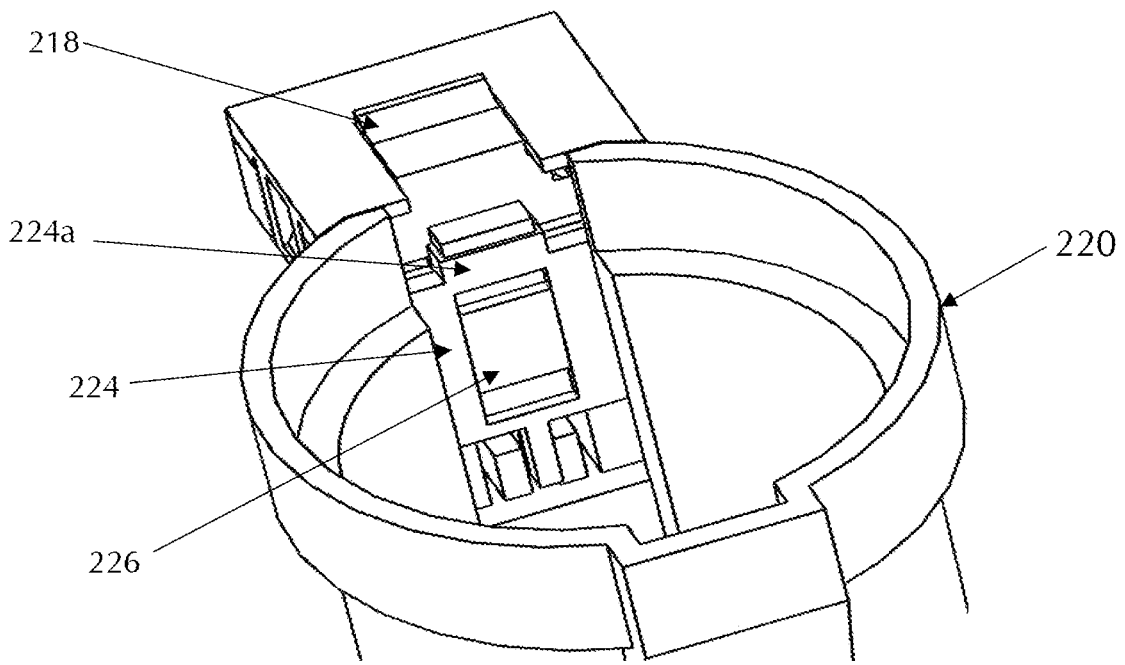
FIG. 23 depicts a partial, perspective, cross-sectional view of the vertical rail side latch configuration of FIG. 22.

FIG. 23 depicts a partial, perspective, cross-sectional view of the vertical rail side latch configuration of FIG. 22, showing the latch holder 224 in the home position. In this position, latch holder arm or protrusion 224a prohibits latch 218 from moving radially inwards towards the filter cartridge (not shown).

Figure 24:
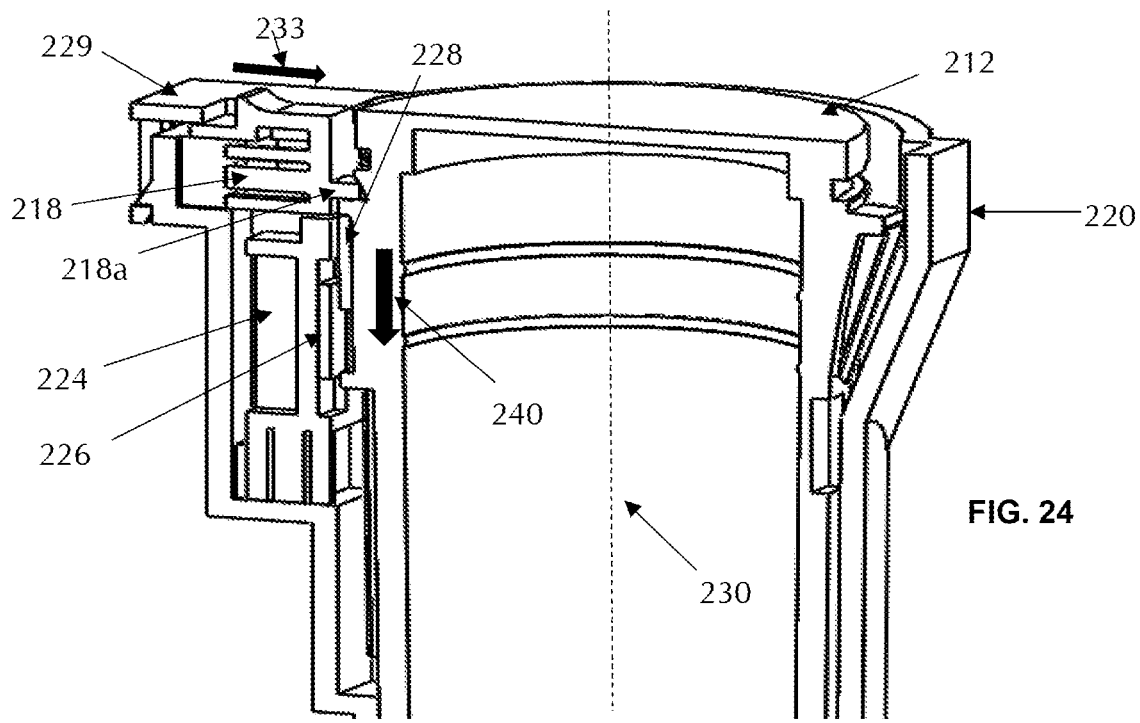
FIG. 24 depicts a partial, perspective, cross-sectional view of the vertical rail side latch configuration showing the coded magnets beginning to align when filter cartridge is installed.

FIG. 24 depicts a partial, perspective, cross-sectional view of the vertical rail side latch configuration showing the coded magnets 226, 228 beginning to align when filter cartridge 212 is installed. This alignment causes magnet holder 224 to shear downwards in the longitudinal or vertical direction of arrow 240. The "vertical" movement of magnet holder 224 (parallel to central longitudinal axis 230) permits latch 218 to move radially inwards in the direction of arrow 233, which in turn extends latch arm 218a towards filter cartridge 212. Latch arm 218a seats adjacent or within filter cartridge protrusion or detent 232, prohibiting filter cartridge 212 from removal, securing the filter cartridge in place.

Figure 25:
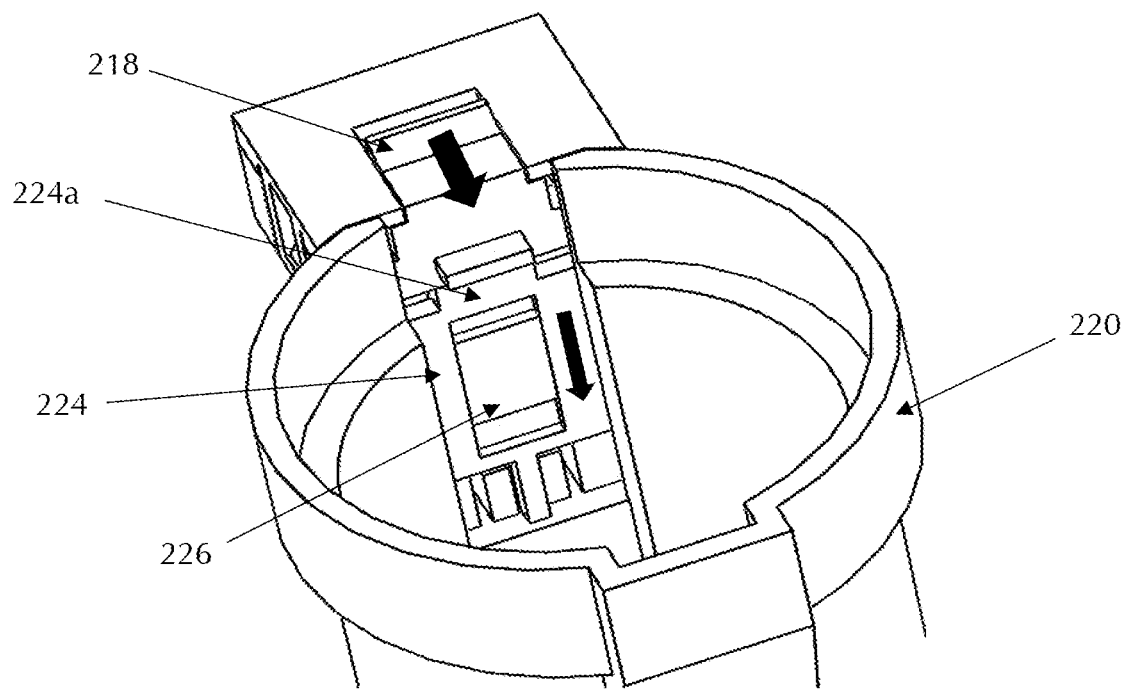
FIG. 25 depicts a partial, perspective, cross-sectional view of the vertical rail side latch configuration of FIG. 24 showing when the magnet holder moves under a magnetic shearing force, latch begins to move radially inwards under a resilient biasing force, such as a spring, and the latch is able to secure the filter cartridge.

FIG. 25 depicts a partial, perspective, cross-sectional view of the vertical rail side latch configuration of FIG. 24 showing when magnet holder 224 moves under a magnetic shearing force, latch 218 begins to move radially inwards under a resilient biasing force, such as a spring, and the latch 218 is able to secure the filter cartridge (not shown).

Figure 26:
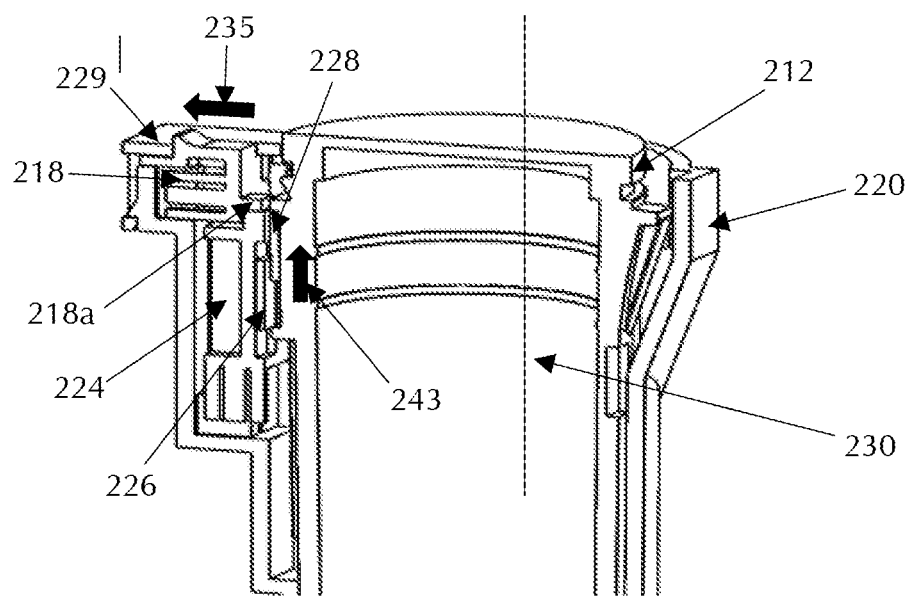
FIG. 26 depicts a partial, perspective, cross-sectional view of the vertical rail side latch configuration during the release stage, where a user pushes back the latch against a biasing resilient force, moving the latch arm radially outwards, thus allowing the magnet holder under its own resilient biasing force to return to its initial position, blocking the latch arm from extending radially inwards.

FIG. 26 depicts a partial, perspective, cross-sectional view of the vertical rail side latch configuration during the release stage, where a user pushes back the latch 218 in the direction of arrow 235 against a biasing resilient force, moving the latch arm 218a radially outwards, thus allowing magnet holder 224 under its own resilient biasing force to return to its initial position in the direction of arrow 243, blocking latch arm 218a from extending radially inwards. In this manner, the resiliently biased magnet holder is allowed to move to hold back the latch arm 218a which would otherwise extend radially inwards.

A method of interconnecting a filter cartridge and a mating filter manifold as delineated in FIGS. 22-26 may include the following method steps: a) inserting the filter cartridge into a sump of the mating filter manifold, the filter cartridge comprising a housing having a body, a bottom surface, a protrusion extending radially outwards from the housing body, the protrusion attached to, or integral with, the housing body and proximate the bottom surface, and a first magnetic structure located on or within the housing body and having a radially outwardly facing surface, the first magnetic structure including a magnet having a plurality of field emission sources having positions and polarities relating to a predefined spatial force function that corresponds to a predetermined alignment of the field emission sources; b) moving the filter cartridge within the filter manifold sump in a first direction; c) aligning the first magnetic structure plurality of field emission sources with a plurality of magnetic field emission sources of a complementary or paired second magnetic structure disposed within a latch blocking mechanism or holder of the filter manifold such that a magnetic shear force is generated, the latch blocking mechanism in slidable communication with a latch translatable radially inwards under a first resilient biasing mechanism and the latch blocking mechanism being biased towards the latch under a second resilient biasing mechanism applying a force to the latch blocking mechanism or holder, the second resilient biasing mechanism force being approximately parallel to the sump central axis; d) moving the latch blocking mechanism away from the latch in a direction approximately parallel to the first direction in response to the magnetic shear force; and e) translating the latch radially inwards to contact the filter cartridge protrusion, thereby securing the filter cartridge to the manifold.

In each of the aforementioned embodiments, the mating polymagnets are coded such that attraction and repulsion forces combine at the polarity transitions to partially cancel normal forces and to create shear forces in accordance with a desired movement behavior. Generally, more of the opposing magnetic source pairs are in a repel state than magnetic source pairs are in an attract state. As the filter cartridge moves towards the alignment position, a slight imbalance exists where an attraction force may cause, for example, a latch holder to pull towards the filter cartridge and the repel forces cause the latch holder to push away from the filter cartridge. As the filter cartridge reaches the alignment position and the coded polymagnets are in operating proximity, the repel forces increase and the attract forces decrease until the complementary magnetic sources achieve alignment and full repulsion at a second position, generating sufficient shear force to move a latch holder in the desired direction.

Valve Actuation

Figure 27:
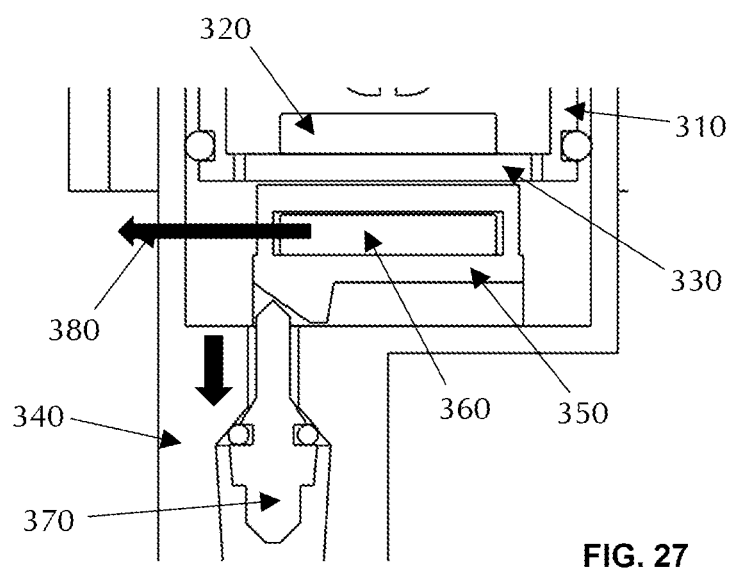
FIG. 27 depicts a cross-sectional view of an exemplary filter interconnect utilizing coded polymagnets to indirectly actuate a valve to allow for the flow of water, and more particularly, polymagnets coded to generate sufficient shear force to indirectly actuate a valve when the polymagnets are in a desired alignment and proximity.

FIG. 27 depicts an exemplary filter interconnect utilizing coded polymagnets of the present invention to actuate a valve, such as a poppet valve. In this embodiment, mating polymagnets are coded to generate sufficient shear force to indirectly actuate a valve in a filter manifold when the polymagnets are in a desired alignment and proximity. An otherwise conventional replaceable filter cartridge 310 comprises a filter media encased between end caps and includes a filter magnet 320 proximately disposed at the filter head 330. As shown in FIG. 27, filter head 330 may include a recess in which magnet 320 is disposed. Disposed within manifold 340 is a shuttle 350 incorporating a mating manifold magnet 360. A valve 370 is normally biased in a closed position by a spring (not shown) to prevent water from flowing in the manifold. Filter cartridge 310 is initially insertable within a sump housing in the filter manifold into an INSTALLED-UNLOCKED position, wherein the O-rings are sealed but the downstream valve(s) are not open and water is not permitted to flow.

The mating polymagnets 320, 360 are coded such that attraction and repulsion forces combine at the polarity transitions to partially cancel normal forces and to create shear forces in accordance with a desired movement behavior. As shown in FIG. 27, when filter cartridge 310 is fully inserted within the sump housing, the polymagnets are in a desired alignment and proximity position, such that the polymagnets produce both repel and attract forces that combine in a manner to cause shearing, which causes shuttle 350 to move towards the second position in accordance with the desired movement behavior. As the filter head moves toward the alignment position, a slight imbalance exists where the attract force causes the shuttle to pull towards the filter head and the repel forces causes the shuttle to push away from the alignment position, which facilitates shear. As the filter head reaches the alignment position and the coded polymagnets are in operating proximity, the repel forces increase and the attract forces decrease until the complementary magnetic sources achieve alignment and full repulsion at the second position, generating sufficient shear force to move the shuttle in the direction of arrow 380 and overcome the spring force to open valve 370.

Vertical Shear Force Upon Insertion to Vertically Move Blocking Mechanism

Referring now to FIGS. 28-30, another embodiment of a filter interconnect utilizing coded polymagnets is shown. In this embodiment, shear force generated when a set of "keyed" polymagnets are aligned and brought into an effective working distance results in the movement and removal of a blocking mechanism or position stop which normally prevents the attachment of a filter cartridge to a mating manifold.

Manifold 340' includes a first channel or alignment groove 342 representing an "entry track" or alignment track for filter cartridge 310' by receiving filter boss or lug 312 when filter cartridge 310' is inserted within the filter manifold. Disposed within filter boss or lug 312 is a first coded polymagnet 320'. As the filter cartridge is inserted, boss or lug 312 travels linearly within an arcuate channel 342 to its end. Arcuate channel 342 is proximate the sump internal cavity. As best seen in FIG. 28, manifold 340' includes a correspondingly "keyed" polymagnet 360' within a magnet housing or shuttle 350' and positioned for alignment with filter magnet 320' when boss or lug 312 is at the end of the arcuate channel 342. Shuttle 350' is non-rotatable but slidable linearly in an axial direction along the axis of the manifold. When filter magnet 320' and manifold magnet 360' are in alignment and brought into an effective working distance, the result is a shear force between the two magnets. The polymagnets are correspondingly coded, such that the polymagnets produce both repel and attract forces that combine to cause shuttle 350' and manifold magnet 360' to move upwards (as shown in FIG. 28) into a second channel 344 and out of the rotational path of filter boss or lug 312. Upon rotation of the filter cartridge, lug 312 is secured by the lower surface of arcuate channel 344. Shuttle 350' is normally biased in a downward position by a spring (not shown), such as a coil spring, disposed within second channel 344. In at least one embodiment, shuttle 350' may be partially recessed within the filter manifold housing when in the biased downward position such that the shuttle 350' cannot be manually forced upwards into channel 44 to allow for insertion of a counterfeit or non-authentic replacement filter cartridge.

FIGS. 30A-30F depicts an exemplary method of installation of a filter cartridge using the filter interconnect shown in FIG. 28. As filter cartridge 310' is inserted within manifold 340', filter boss or lug 312 with coded polymagnet 320' is received within first channel 342 (FIGS. 30A-30B). Filter boss or lug 312 travels linearly within alignment channel 342 to its end, at which point magnet 320' is positioned for alignment with manifold magnet 360' (FIG. 30C). The mating polymagnets 320', 360' are coded such that attraction and repulsion forces combine at the polarity transitions to partially cancel normal forces and to create shear forces in accordance with a desired movement behavior. As shown in FIGS. 30D-30E, when filter cartridge 310' is fully inserted within the sump housing, the polymagnets are in a desired alignment and proximity position, such that the polymagnets produce both repel and attract forces that combine to cause shuttle 350' to move away from lug 312 in a second position in accordance with the desired movement behavior, e.g., upwards (as shown in FIGS. 30D-30F) into manifold second channel 344 and out of the rotational path of filter boss or lug 312.

As the filter boss or lug 312 reaches the alignment position and the coded polymagnets 320', 360' are in operating proximity, the repel forces increase and the attract forces decrease until the complementary magnetic sources achieve alignment and full repulsion at the second position, moving the manifold magnet housing in the direction of arrow 390 and overcoming the spring force which normally biases the shuttle in a downward position (FIGS. 30D-30E). With the manifold magnet shuttle out of the way, filter cartridge 310' is permitted to rotate into the INSTALLED-LOCKED position, such that boss or lug 312 rotates into the recess vacated by the manifold magnet shuttle 350' (FIG. 30F). In an embodiment, filter cartridge 310' rotates about 60 degrees from a first position into the INSTALLED-LOCKED position as shown in FIG. 29.

In that correlated magnets are characterized by dense and tunable magnetic fields, it is possible to specifically engineer force curves with higher force at shorter working distances, such as those shown in FIGS. 28-30. A conventional magnet would be unable to produce sufficient magnetic shear force over such a short effective working distance without significantly increasing the physical size of the magnet, which would present design feasibility issues. Alignment polymagnets, such as those of the present invention, allow for attraction and repel forces to combine at polarity transitions to partially cancel normal forces and create stronger shear forces over shorter linear offset distances.

Another advantage of the present invention is that by utilizing corresponding coded or "keyed" polymagnets with specifically-engineered magnetic fields, the present invention further has applications in alternate methods of filter cartridge authentication and counterfeiting prevention. Only filter cartridges including a "coded" polymagnet having a pre-designed or predetermined polarity profile which corresponds to that of the polymagnet in the filter manifold will operate correctly, such as removing a blocking mechanism to allow for filter cartridge installation. Therefore, only genuine replacement filter cartridges from the manufacturer or its licensee will be authenticated. This limits the counterfeiting market, which is especially important with respect to the safety of consumers who believe that they may be able to save money by purchasing a non-authentic replacement filter cartridge which mechanically may connect to a mating manifold, but may nonetheless not have an enclosed filter media which is as effective for removal of contaminants or impurities in water as that of the filter media of a genuine replacement part.

A method of interconnecting a filter cartridge and a mating filter manifold as delineated by FIGS. 28-30, is described as follows: a) inserting the filter cartridge into a sump of the mating filter manifold, the filter cartridge comprising a housing having a body, a filter boss or lug extending radially outwards from the housing body, and a first magnetic structure disposed within or connected to the filter boss or lug, the first magnetic structure having an outwardly-facing surface and including a plurality of field emission sources having positions and polarities relating to a predefined spatial force function that corresponds to a predetermined alignment of the field emission sources; b) aligning the filter boss or lug with an arcuate channel of the filter manifold such that the first magnetic structure plurality of magnetic field emission sources are aligned with a plurality of magnetic field emission sources of a complementary or paired second magnetic structure disposed within a resiliently biased blocking mechanism at least partially extending within the arcuate channel of the filter manifold, such that a magnetic shear force is generated therebetween; c) displacing the blocking mechanism to a retracted position in an axial direction in response to the magnetic shear force, the axial direction approximately parallel to a central axis of the filter manifold sump; and d) rotating the filter cartridge about the sump central axis within the arcuate channel such that the filter boss or lug is secured by a bottom surface of the arcuate channel to complete attachment of the filter cartridge to the filter manifold.

Figure 31:
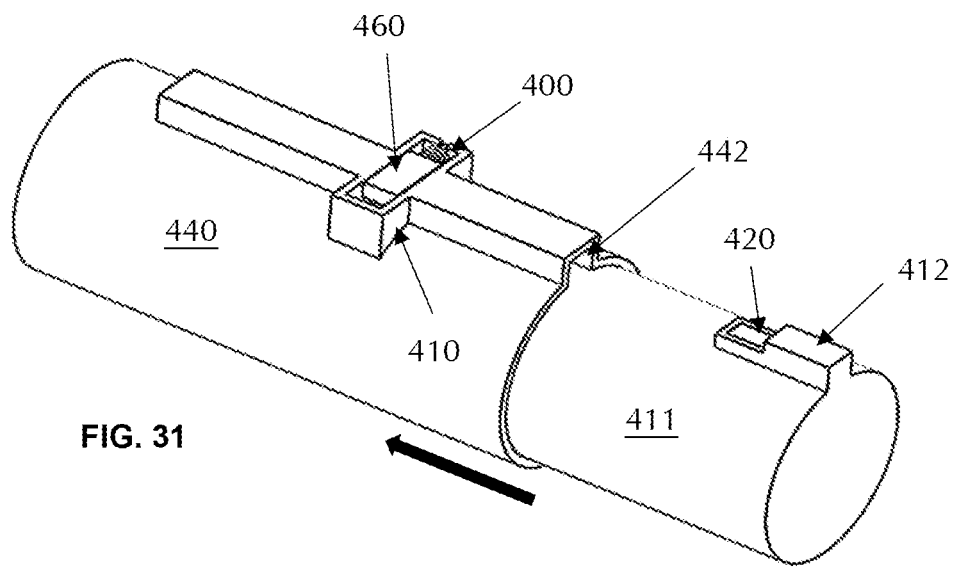
FIG. 31 depicts a perspective view of another embodiment of a filter interconnect utilizing polymagnets coded to generate sufficient shear force to move a blocking mechanism or position stop to allow for proper filter cartridge installation in a mating manifold when the polymagnets are in a desired alignment and proximity.

Referring now to FIG. 31, another embodiment of a filter interconnect of the present invention is shown, wherein a shear force is generated between coded polymagnets on the filter cartridge and manifold, respectively, without requiring rotation of the filter cartridge to move the polymagnets into an alignment position. Similar to the embodiment shown in FIGS. 28-30, the filter manifold 440 includes a blocking mechanism or position stop normally biased to the closed position by a spring 400, such as a coil spring, for preventing insertion of a filter cartridge. Blocking mechanism or position stop includes a first coded polymagnet 460 and rides within a track 410 normal to the longitudinal axis of the filter manifold. Manifold 440 includes a channel 442 representing an "entry track" or alignment track for filter cartridge 411 by receiving an alignment rib or boss 412 disposed on the filter cartridge housing when filter cartridge 411 is inserted within the filter manifold 440. The blocking mechanism serves to block the alignment track 442 and prevent insertion of a filter cartridge when in a first (biased) position. As shown in FIG. 31, adjacent alignment rib 412 on the filter cartridge housing is a second, complementary coded polymagnet 420.

As the filter cartridge is inserted, alignment rib 412 travels linearly within channel 442 in the direction of blocking mechanism or position stop. When filter magnet 420 and manifold magnet 460 are in alignment and brought into an effective working distance, the result is a shear force between the two magnets. The polymagnets are correspondingly coded, such that the polymagnets produce both repel and attract forces that combine to cause the blocking mechanism or position stop to move linearly or radially about the filter manifold (as shown in FIG. 31) and out of the path of the filter cartridge alignment rib 412. The alignment rib is then permitted to traverse beyond the space vacated by the blocking mechanism or position stop, allowing the filter cartridge to be inserted into a fully INSTALLED-LOCKED position.

Figure 32:
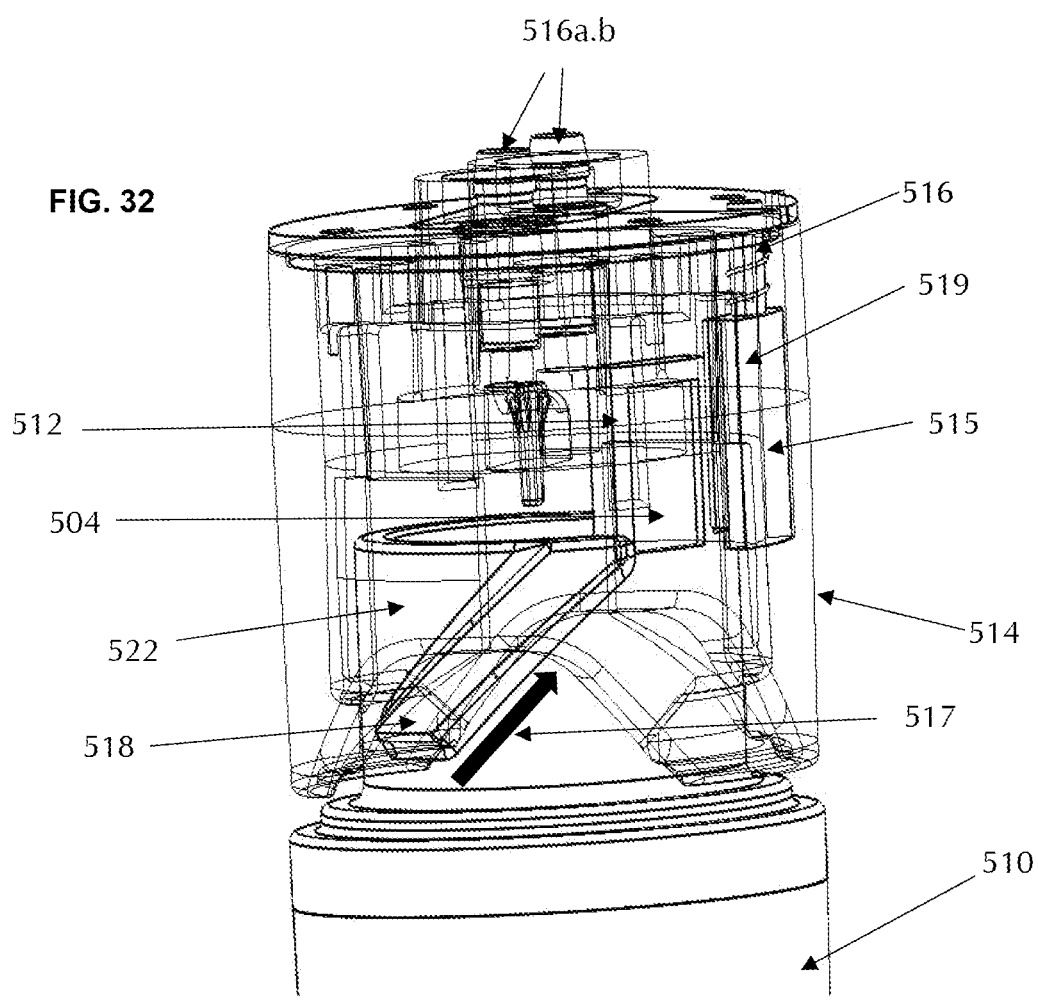
FIG. 32 depicts a transparent, perspective view of a filter cartridge—manifold combination using magnetic shear force to remove a block structure that would otherwise prohibit complete rotation.

In yet another embodiment, a magnetic shear force is generated by the rotation of a first magnetic structure mounted on the filter cartridge, which is rotated into close proximity to a second magnetic structure which is in a fixed position on the manifold. FIG. 32 shows this particular embodiment of the present invention. FIG. 32 depicts a transparent, perspective view of a filter cartridge—manifold combination using magnetic shear force to remove a block structure that would otherwise prohibit complete rotation. In this embodiment, filter cartridge 510 includes an annular collar 522 with securing lugs or threads 518 and a tab 512 supporting a first magnetic structure. The cartridge is designed to be insertable within manifold 514 having a blocking structure 519 holding a complementary second magnetic structure 515. Manifold 514 has water ingress and egress ports 516a,b which allow incoming water to be received by the manifold, flow into filter cartridge 510, and receive filtered water from the filter cartridge. Lugs or threads 518 secure filter cartridge 510 to manifold 514 upon rotation. A locking mechanism may also be employed to secure further the filter cartridge from reverse rotation.

As depicted in FIG. 32, lugs or threads 518 as shown extending radially outwards from an outside wall of annular collar 522. It is also possible to have receiving apertures and/or receiving threaded grooves on the outside wall of the annular collar 522 to receive lugs or threads on the manifold. Tab 512 is shown extending axially upwards from annular collar 522 and radially outwards at least less than the radial extension of lugs 518, and preferably no further radially outwards than the outside wall of annular collar 522, such that tab 512 does not interfere with the rotation of the filter cartridge within the receiving manifold. It is also possible for tab 512 to be form-fit within the annular collar or on the inside wall of the annular collar, and it need not extend axially upwards from the annular collar. The necessary condition for attachment is that there is magnetic communication between the magnet located on the filter cartridge and the complementary magnet located on the manifold.

In this embodiment, filter cartridge 510 is rotated into manifold 514. Lugs or threads 518 include at least a portion of upwardly angled segments, which upon rotation serve to raise the filter cartridge within the manifold as the filter is rotated in the direction of arrow 517. A first magnetic structure 504 is secured by tab 512, which extends axially upwards from annular collar 522.

During rotation, first magnetic structure 504 comes in close proximity to second magnetic structure 515 supported by manifold 514. Second magnetic structure 515 blocks rotation of filter cartridge 510 by interfering with the path of angled lugs or threads 518 until first magnetic structure 504 is moved into close proximity to second magnetic structure 515. Second magnetic structure 515 is biased axially downwards by resilient spring 516. Once the magnetic structures are in close proximity, the magnet 519 in the second magnetic structure undergoes a magnetic shear force that overcomes the resilient force provided by spring 516, and is moved axially upwards, clearing a path for lugs 518 to complete the rotation of filter cartridge 510.

Figure 33:
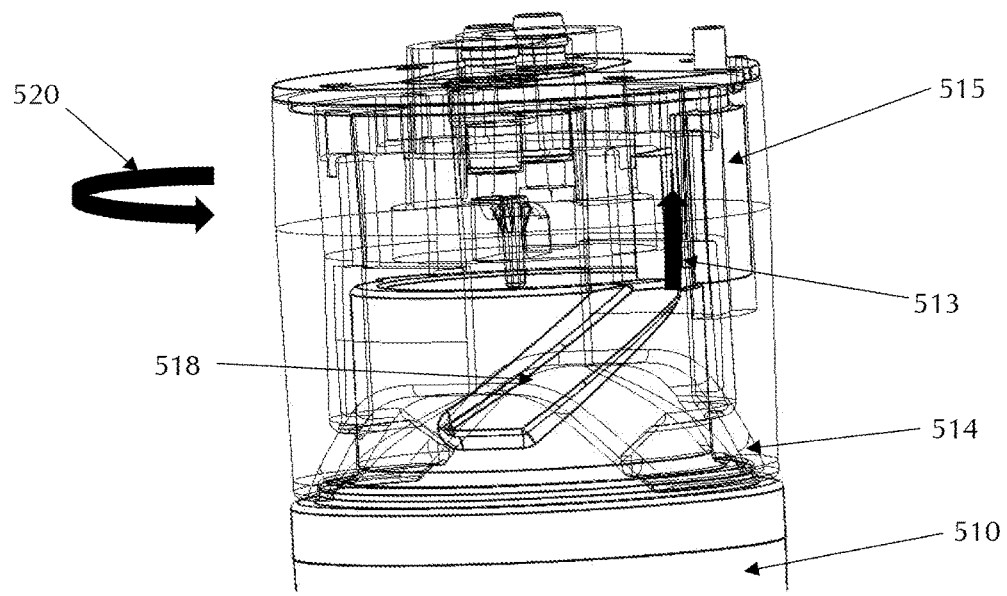
FIG. 33 depicts a transparent, perspective view of the filter cartridge—manifold housing combination of FIG. 32 when the first magnetic structure is aligned with a second magnetic structure.

FIG. 33 depicts a transparent, perspective view of the filter cartridge—manifold housing combination when the first magnetic structure 504 is aligned with the second magnetic structure 515. As shown, second magnetic structure 515 is lifted from its original position in the direction of arrow 513 allowing for further rotational motion of the filter cartridge in the direction of arrow 520.

Figure 34A:
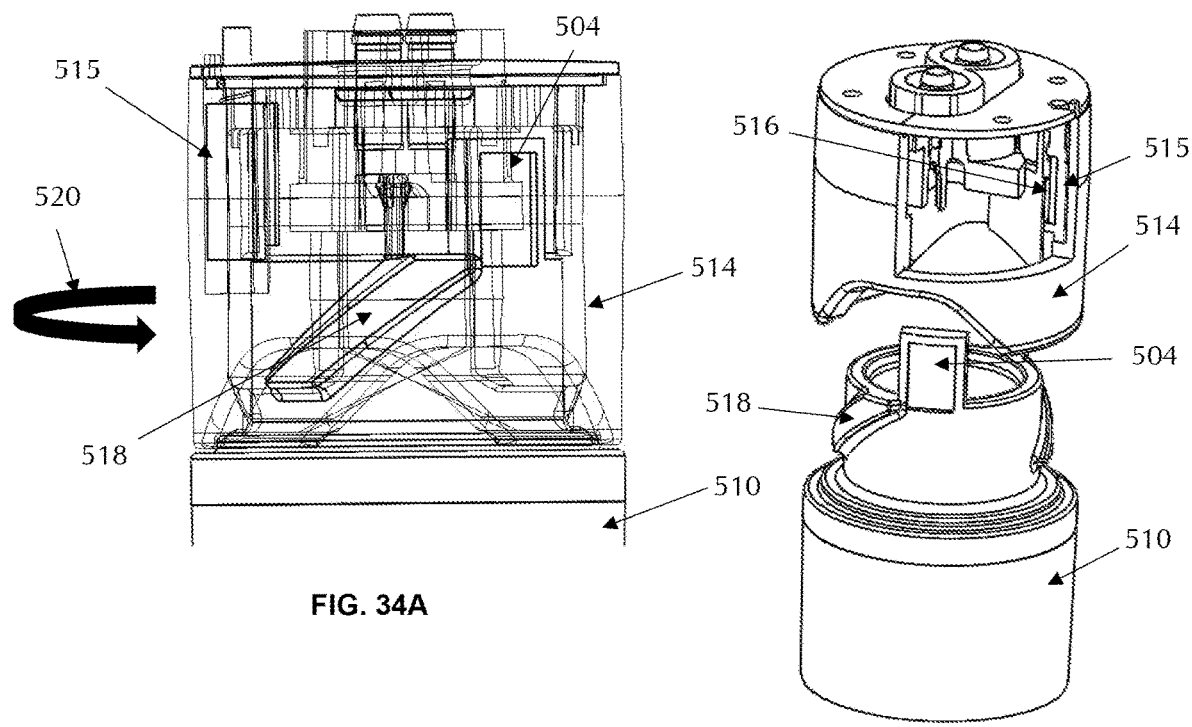
FIG. 34A depicts a transparent, perspective view of the final, inserted position of filter cartridge into manifold housing of the embodiment of FIG. 32.

FIG. 34A depicts a transparent, perspective view of the final, inserted position of filter cartridge 510 into manifold housing 514. Filter cartridge 510 is shown rotated past second magnetic structure 515, which serves as the blocking structure, as the axial upwards magnetic shear force shifted the second magnetic structure 515 upwards, and permitted lugs 518 to continue rotation uninhibited. A locking mechanism may be implemented at this point in rotation so that filter cartridge 510 is prohibited from inadvertent release.

Figure 34B:
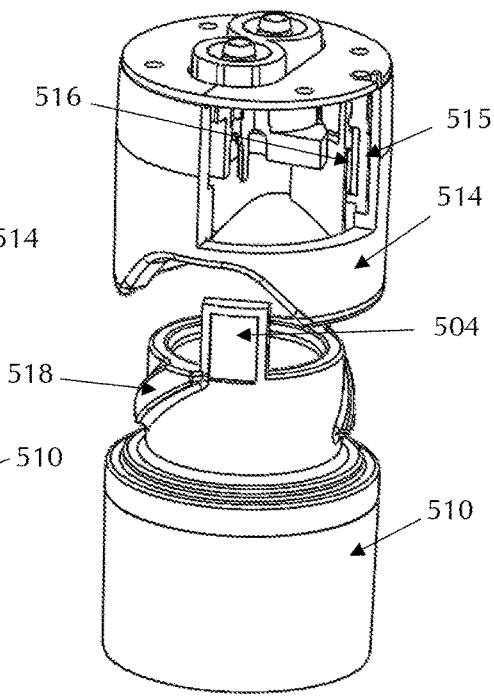
FIG. 34B depicts a perspective view of the final, inserted position of filter cartridge into the manifold housing with a cut-out portion of the manifold showing the internal structure, and a cut-out portion of the second magnetic structure presenting the correlated magnet therein.

FIG. 34B depicts a perspective view of the final, inserted position of filter cartridge 510 into manifold housing 514 with a cut-out portion of the manifold 514 showing the internal structure, and a cut-out portion of the second magnetic structure 515 presenting the correlated magnet 516 therein.

The physical blocking presented by second magnetic structure 515 is removed by the interaction of the two magnetic structures creating an upward shear force.

The physical movement of either magnetic structure may also be used to activate a switch or valve, or otherwise engage an engagement mechanism, capable of initiating another function such as allowing water to flow, activating an electronic signal, or the like. In this manner, the rotation of the filter cartridge causing an axially upwards movement of the second magnetic structure may perform more than the simple defeating of a blocking mechanism.

A method of interconnecting the filter cartridge and a mating filter manifold represented by FIGS. 32-34 may be described in the following manner a) inserting the filter cartridge into a sump of the mating filter manifold, the filter cartridge comprising a housing having a body with a top surface, and an annular collar circumferentially located about the housing body top surface and having an outer wall, the annular collar including securing lugs or threads extending radially outwards from the annular collar outer wall, and a first magnetic structure located on or within the annular collar and having a radially outwardly-facing surface that extends no further than an outward most radial extension of the securing lugs or threads, wherein the first magnetic structure includes a magnet having a plurality of field emission sources having positions and polarities relating to a predefined spatial force function that corresponds to a predetermined alignment of the field emission sources; b) aligning the securing lugs or threads with an alignment channel of the filter manifold; c) rotating the filter cartridge within the filter manifold sump in a first direction; d) aligning the first magnetic structure plurality of magnetic field emission sources with a plurality of magnetic field emission sources of a complementary or paired second magnetic structure disposed within a resiliently biased blocking mechanism at least partially extending within the alignment channel of the filter manifold, such that a magnetic shear force is generated; e) displacing the blocking mechanism to a retracted position in a second direction in response to the magnetic shear force, the second direction approximately perpendicular to the first direction; and f) rotating the filter cartridge in the first direction such that the securing lugs or threads pass below the displaced blocking mechanism to complete attachment of the filter cartridge to the filter manifold.

Figure 35:
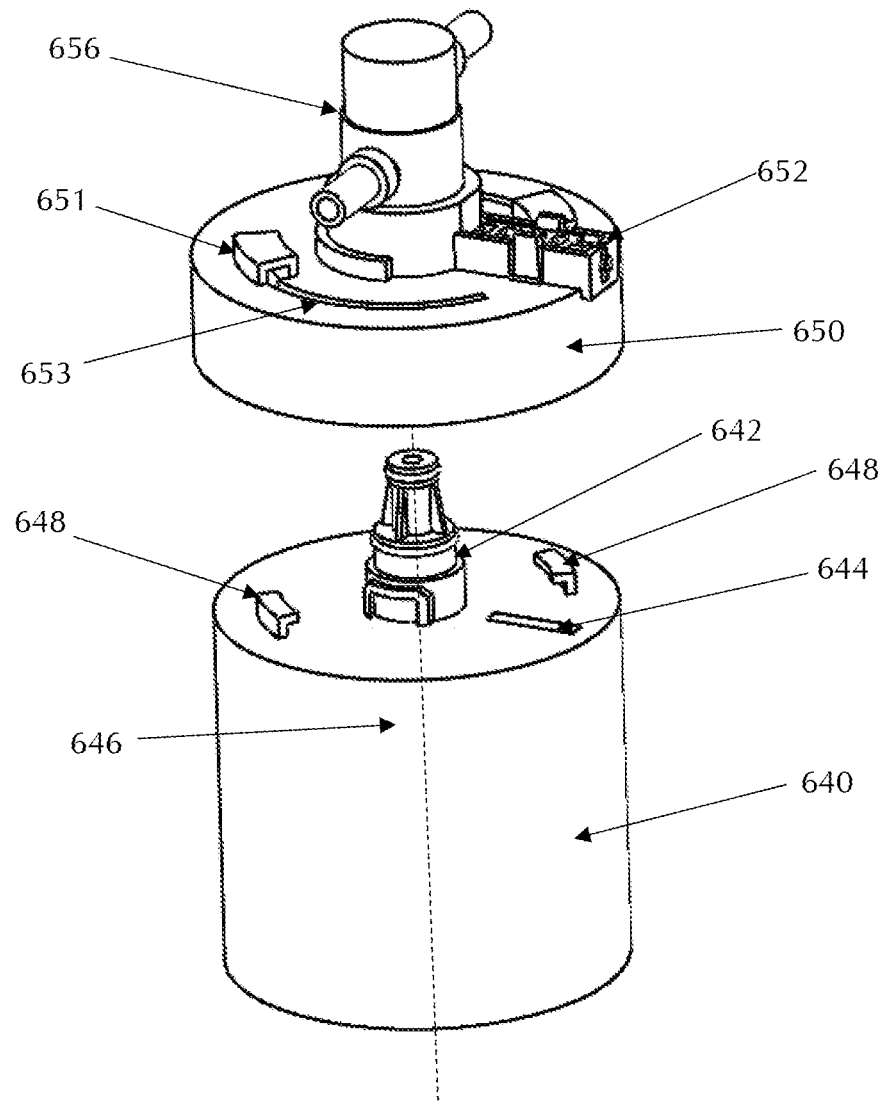
FIG. 35 depicts a prospective view of the salient components of a second embodiment of the present invention, depicting the filter cartridge and manifold, which together perform a magnetic shear force for removing a blocking mechanism.

In another embodiment, the interaction of first and second magnetic structures are demonstrated to move a second magnetic structure blocking mechanism radially away from the center axis so as to allow further rotation of the filter cartridge and/or activate separately or in combination a switch or valve. This configuration is referred to as a rotating shear block configuration. FIG. 35 depicts a prospective view of the salient components of this design—the filter cartridge and manifold, which together perform a magnetic shear force for removing a blocking mechanism.

A depicted in FIG. 35, a filter cartridge 640 includes an axial stem 642 with ingress/egress ports and a first magnetic structure 644 located radially outwards from center axis 646. As discussed further below, locking lugs 648 secure filter cartridge 640 to manifold housing 650. Manifold housing 650 includes receiving apertures 651 and receiving arcuate slots 653 to assist in attachment of filter cartridge 640.

Figure 36:
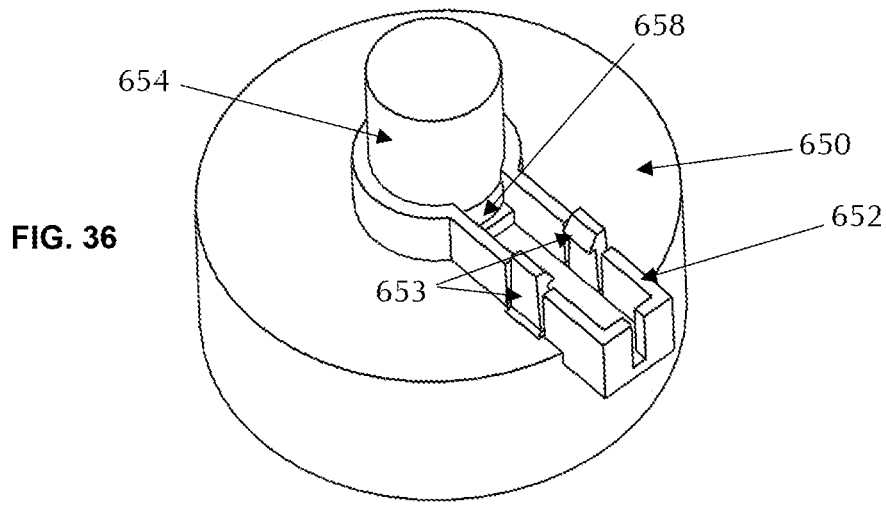
FIG. 36 is a top perspective view of the manifold housing of the embodiment of FIG. 35.

FIG. 36 is a top perspective view of manifold housing 650. Manifold housing 650 is configured with an axial stem 654 which is used for supporting a valve assembly (not shown). A locking member retention or holder 652 is formed extending radially outwards from axial stem 654. At the junction of axial stem 654 and the radial-most inward portion of locking member retention 652 is an open slot 658. Opposing resilient locking tabs 653 having angled faces are configured to receive a locking member 660 in a snap-in fit, securing locking member 660 within locking member retention 652 while allowing locking member 660 to slide in a direction radially inwards and outwards.

Figure 37:
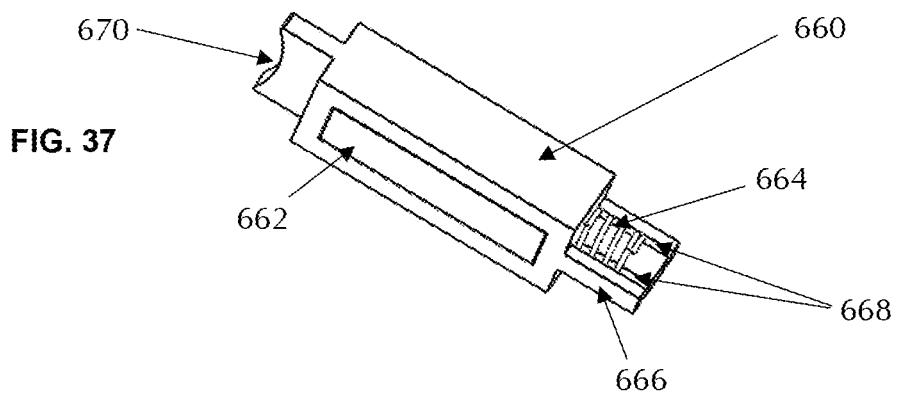
FIG. 37 depicts a bottom perspective view of a locking member of the embodiment of FIG. 35, having a second magnetic structure located on the bottom surface.

FIG. 37 depicts a bottom perspective view of locking member 660 having a second magnetic structure 662 located on the bottom surface. Locking member 660 is secured within locking member retention 652 on the manifold housing 650. A resilient member 664, such as a spring, provides a radially inwards force to locking member 660 when locking member 660 is inserted within locking member retention 652. Resilient member 664 acts on an inward wall of the radially outward-most side or face of locking member retention 652, such that without an opposing force, locking member 660 is directed towards slot 658 by resilient member 664.

In the current embodiment, resilient member 664 is supported by slotted protrusion 666, which extends from the body of locking member 660 in a radially outwards direction when locking member 660 is placed within locking member retention 652. Protrusion 666 includes parallel slotted apertures 668 for receiving and holding resilient member 664.

On the locking member end opposite protrusion 666 is a locking tab 670. Locking tab 670 is designed to be received by slot 658 when locking member 660 is acted upon by resilient member 664, and pushed radially inwards towards axial stem 654.

Figure 38:
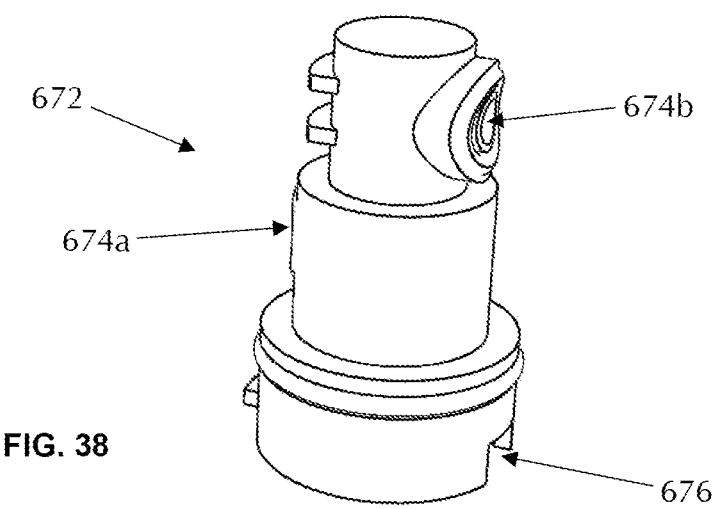
FIG. 38 depicts an embodiment of a valve assembly for use with the embodiment of FIG. 35.

FIG. 38 depicts one embodiment of a valve assembly 672 of the present invention. Valve assembly 672 includes ingress and egress ports 674a,b and a notch 676 that is configured to allow valve assembly 672 to be supported by axial stem 654 and seat circumferentially on the filter cartridge housing top surface. Notch 674 is designed to be placed over locking retention member 652.

Figure 39:
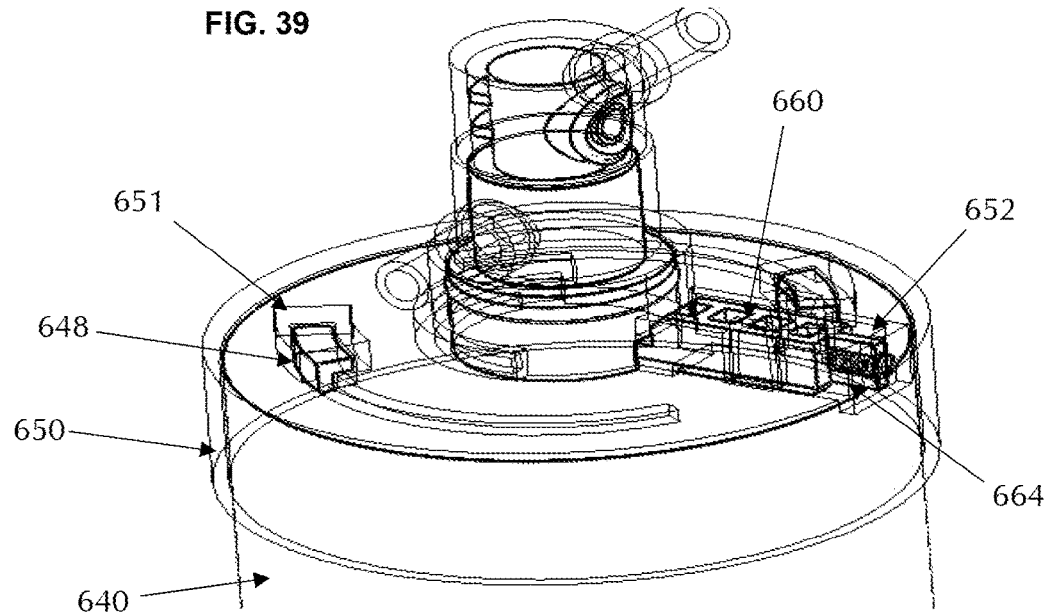
FIG. 39 depicts a transparent, perspective view of a fully inserted filter cartridge within the manifold housing of FIG. 35.

FIG. 39 depicts a transparent, perspective view of a fully inserted filter cartridge 640 within manifold housing 650. Locking lugs 648 of filter cartridge 640 are inserted within receiving apertures 651. In this position, first and second magnetic structures are aligned so that magnetic communication is initiated. When this occurs, locking member 660 with second magnetic structure 662 is acting upon by a magnetic shearing force that slides locking member 660 radially outwards inside locking member retention 652. This action overcomes the radially inwards force of resilient member 664.

Figure 40:
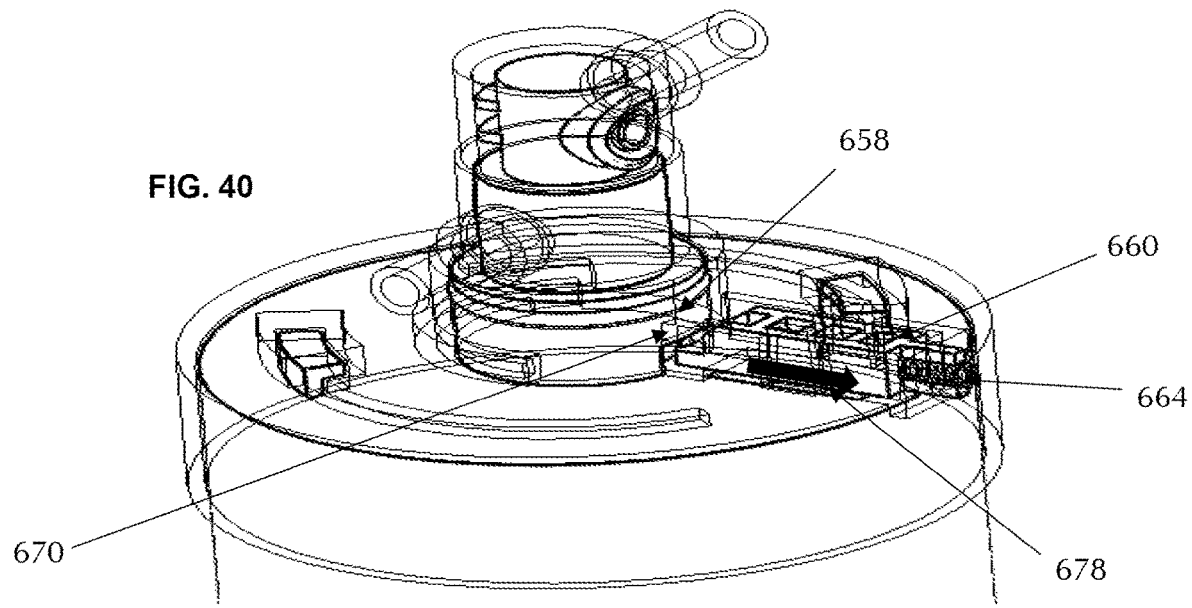
FIG. 40 depicts a transparent, perspective view of the locking member configuration of the embodiment of FIG. 35 when acted upon by a magnetic shearing force in a direction radially outwards.

FIG. 40 depicts a transparent, perspective view of the locking member 660 configuration when acted upon by a magnetic shearing force in a direction radially outwards, as denoted by arrow 678. Locking tab 670 is removed from slot 658 in this filter cartridge inserted position.

With locking member 660 sheared radially outwards, filter cartridge 640 is allowed to rotate as shown in the direction of arrow 680.

Figure 41:
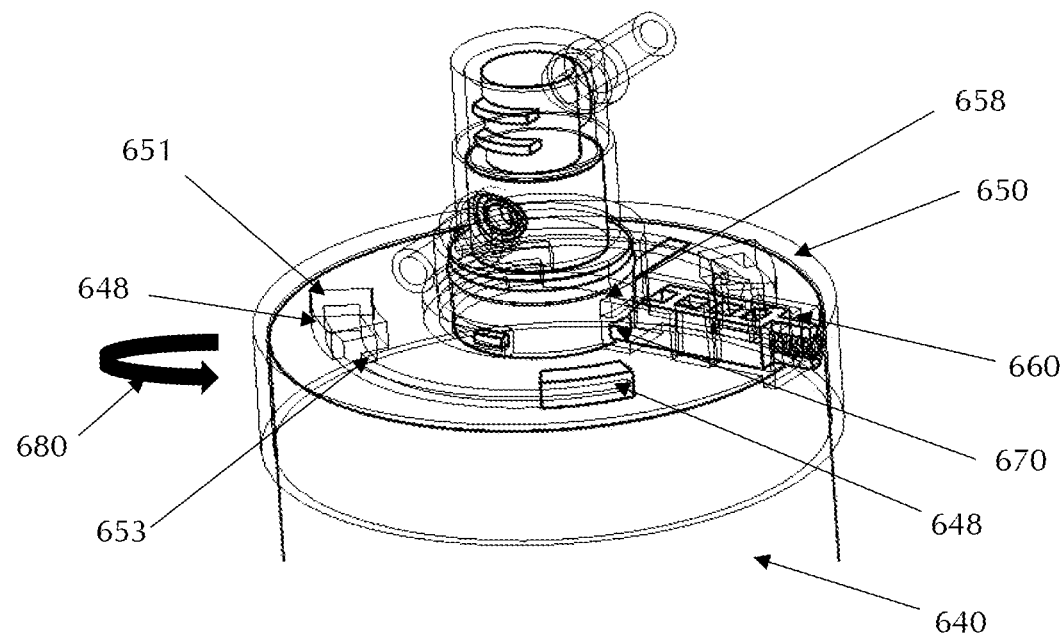
FIG. 41 depicts a transparent, perspective view of filter cartridge of the embodiment of FIG. 35 inserted within, and rotated about, the manifold housing.

FIG. 41 depicts a transparent, perspective view of filter cartridge 640 inserted within, and rotated about, manifold housing 650. While locking tab 670 of locking member 660 is removed from the manifold slot 658, locking lugs 648 are able to rotate through the arcuate path of slots 653 upon rotation of cartridge 640. At the completion of rotation, water flows through valve assembly 672 to and from filter cartridge 640.

A method of interconnecting a filter cartridge and a mating filter manifold may be delineated as follows: a) inserting the filter cartridge into a sump of the filter manifold, the filter cartridge comprising a cylindrical housing having a top surface, attachment lugs positioned on and extending from the top surface, and a first magnetic structure located on or in close proximity to the top surface, the first magnetic structure including a magnet having a plurality of field emission sources having positions and polarities relating to a predefined spatial force function that corresponds to a predetermined alignment of the field emission sources; b) aligning the first magnetic structure plurality of magnetic field emission sources with a plurality of magnetic field emission sources of a complementary or paired second magnetic structure integral with or located on a bottom surface of a locking member insertable within, and in slidable communication with, a locking member retention or holder extending radially outwards with respect to an axial center of the filter manifold sump, such that a magnetic shear force is generated; c) moving the locking member within the locking member retention or holder in a first direction radially outwards away from the filter manifold sump axial center in response to the magnetic shear force; and d) rotating the filter cartridge attachment lugs through arcuate slots of a top surface of the filter manifold to complete attachment of the filter cartridge to the filter manifold.

Figure 42:
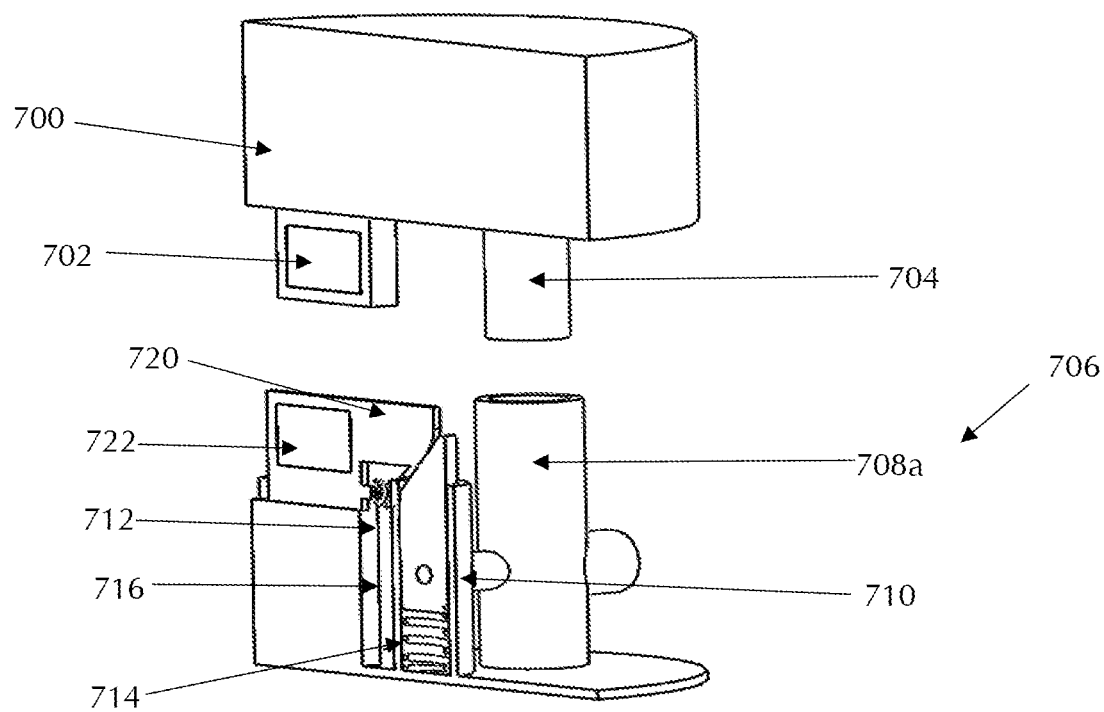
FIG. 42 depicts an isometric cross-sectional partial view of a filter cartridge housing top portion having a first magnetic structure and ingress/egress port, and being inserted within a manifold housing receiving portion.

Magnetic shear forces may also be utilized in a filter cartridge—manifold configuration specifically to activate or engage a valve. FIG. 42 depicts an isometric cross-sectional partial view of a filter cartridge housing top portion 700 having a first magnetic structure 702 and ingress/egress ports (one such port shown here as single cylinder 704), being inserted within manifold housing receiving portion 706.

Figure 43:
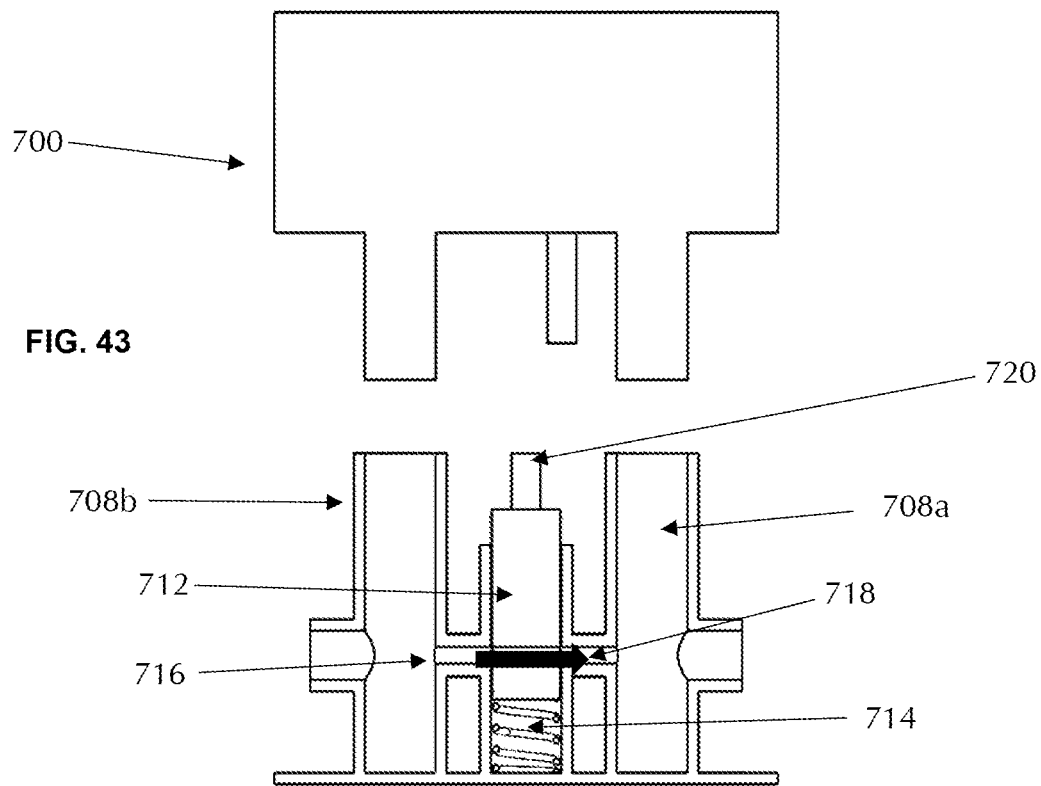
FIG. 43 depicts the filter—manifold combination of FIG. 42 when a valve is in bypass mode, and water flows through a water channel away from, and not directed to, the filter cartridge.

Manifold housing receiving portion 706 includes a complementary port 708a for water ingress that receives cylinder 704 of the filter cartridge. (A complementary port 708b for water egress is shown in FIG. 43). Port 708 includes a water flow channel 710 connected to bypass valve 712. Bypass valve 712 is biased in the open position by resilient spring 714 to allow water to flow through channel 716 without entering (thus, bypassing) the filter cartridge. In this manner, when a filter cartridge is not installed in the manifold housing, a user will still be able to access water.

FIG. 43 depicts the filter—manifold combination of FIG. 18 when valve 212 is in bypass mode, and water flows through channel 216 in the direction of arrow 218. At this stage, second magnetic structure 222 held by shear magnet holder 220 is not activated or under any magnetic forces.

Figure 44:
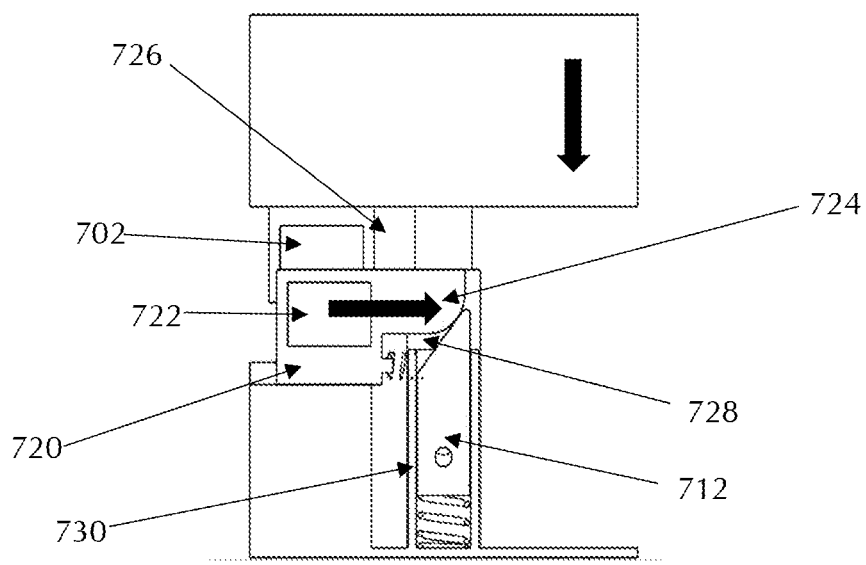
FIG. 44 depicts a cross-sectional view of the filter cartridge—manifold combination of FIG. 42, where the filter cartridge is partially installed and the first and second magnetic structures are in close proximity to one another.

FIG. 44 depicts a cross-sectional view of the filter cartridge—manifold combination of FIG. 42, where the filter cartridge is partially installed and the first and second magnetic structures 702, 722 are in close proximity to one another. Shear magnet holder 720 begins to shift perpendicular to the axial direction of the inserted filter cartridge in the direction of arrow 724. An extended arcuate projection 726 of shear magnet holder 720 interfaces in a camming fashion with angled face 728 on an exposed end of valve 712. As valve 712 is pushed against resilient spring 714, aperture 730, formed in valve 712, shifts away from channel 716, thus closing channel 716 to water flow.

Figure 45:
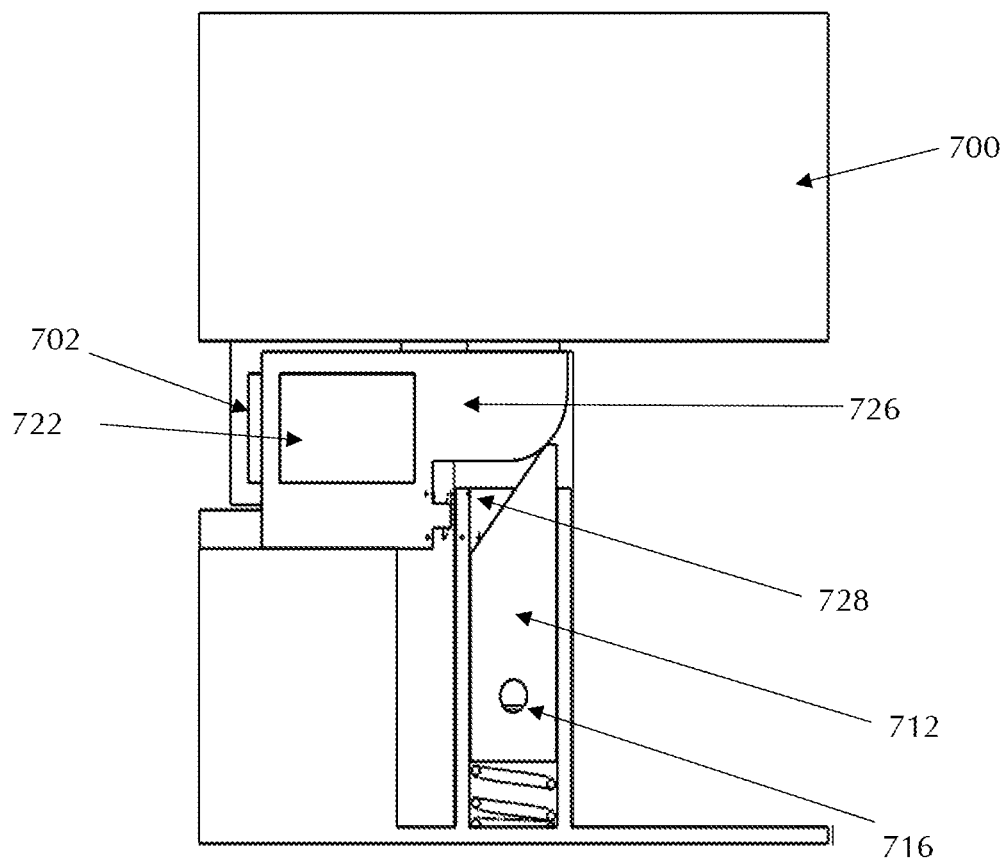
FIG. 45 depicts a cross-sectional view of the filter cartridge—manifold combination of FIG. 42, where the filter cartridge is completely installed and the first and second magnetic structures are in full magnetic communication in which a maximum shear force is applied between them.

FIG. 45 depicts a cross-sectional view of the filter cartridge—manifold combination of FIG. 42, where the filter cartridge is completely installed and the first and second magnetic structures 702, 722 are in full magnetic communication in which a maximum shear force is applied between them.

Water channel 716 is completely cut-off by valve 712, thus directing water through filter cartridge 700. Shear magnet holder 720 is fully shifted at this point, performing a camming function with angled face 728 of valve 712.

In each embodiment above, two separate, complementary magnetic structures are brought in close proximity to one another to induce a magnetic shearing force, where the force is perpendicular to the initial direction of the approaching magnetic structures. In this manner, interfering blocking structures can be displaced to allow complete interconnection, and valves or switches may be activated to perform various related operational functions.

Generally, the method of operation provides for certain salient steps:

a. Introducing a first component, such as a filter cartridge, having a first magnetic structure, wherein the magnetic structure includes a first set of predefined tracks of magnetic sources magnetically printed into a first magnetizable material;

b. Introducing a second component, such as a receiving manifold, configured to receive the first component, the second component having a complementary second magnetic structure comprising a second set of predefined tracks of magnetic sources magnetically printed into a second magnetizable material;

c. Bringing the first and second components in close proximity to one another by moving them closer together in a first direction, such that the first and second magnetic structures are placed in close proximity, generating a magnetic shear force in a second direction perpendicular to the first direction;

d. Utilizing the magnetic shear force generated by bringing the first and second magnetic structures in close proximity to one another to displace a blocking component and/or activate a valve or switch; and e. Reversing the connection direction to remove the magnetic shear force upon removal and separation of the first component from the second component, thus reintroducing the blocking mechanism, or deactivating the valve or switch.

Thus, the present invention achieves one or more of the following advantages. The present invention provides an improved filter interconnect structure for a filter cartridge and a corresponding filter manifold which utilizes coded polymagnets to assist in filter installation and replacement, as well as aid in downstream system functionality, such as actuating a valve, either directly or indirectly, to allow for or prevent the flow of water. The present invention further provides an improved method of installing a filter cartridge in a corresponding filter manifold which utilizes correlated magnetism to move a blocking mechanism or position stop to allow for proper filter cartridge installation. By utilizing coded polymagnets with specifically-engineered force curves, the present invention further has applications in alternate methods of filter cartridge authentication and counterfeiting prevention.

In the embodiments described above, a magnetic shear force is generated when a set of "keyed" or coded polymagnets are aligned and brought into an effective working distance, which results, in some instances, in the movement and removal of a blocking mechanism or position stop which normally prevents a filter cartridge from being secured within a manifold sump.

In that correlated magnets are characterized by dense and tunable magnetic fields; it is possible to specifically engineer force curves with higher force at shorter working distances. A conventional magnet would be unable to produce sufficient magnetic shear force over such a short effective working distance without significantly increasing the physical size of the magnet, which would present design feasibility issues. Alignment polymagnets, such as those of the present invention, allow for attraction and repel forces to combine at polarity transitions to partially cancel normal forces and create stronger shear forces over shorter linear offset distances.

Another advantage of the present invention is that by utilizing corresponding coded or "keyed" polymagnets with specifically-engineered magnetic fields, the present invention further has applications in alternate methods of filter cartridge authentication and counterfeiting prevention. Only filter cartridges including a "coded" polymagnet having a pre-designed or predetermined polarity profile which corresponds to that of the polymagnet in the filter manifold will operate correctly, such as removing a blocking mechanism to allow for filter cartridge installation. Therefore, only genuine replacement filter cartridges from the manufacturer or its licensee can be authenticated. This limits the counterfeiting market, which is especially important with respect to the safety of consumers who unbeknown to them, inferior filter cartridges that may be purchased, and which would otherwise attach to the manifold, can no longer be secured to the manifold sump. This safety mechanism ensures the use of an enclosed filter media which is effective for removal of contaminants or impurities in water.

While the present invention has been particularly described, in conjunction with specific embodiments, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A filtration system comprising:
a filter manifold having ingress and egress fluid receiving ports, a sump housing having an inner cavity for receiving a mating filter cartridge, and a latch housing comprising a latch and a latch blocking mechanism or holder, wherein said latch blocking mechanism includes a first magnetic structure therein, said first magnetic structure including a polymagnet having a plurality of magnetic field emission sources having positions and polarities relating to a predefined spatial force function that corresponds to a predetermined alignment of said magnetic field emission sources, said latch blocking mechanism movable in a first direction responsive to a non-physical magnetic shear force generated when a complementary or paired second magnetic structure is moved in a direction approximately parallel to said first direction and when positioned in close proximity to said first magnetic structure; and
said filter cartridge including:
a housing having a body, a top surface, a bottom surface, an axial length, and an internal cavity;
an ingress port and an egress port, each of the fluid ingress port and the fluid egress port extending axially upward from the top surface and in fluid communication with said internal cavity, said ingress and egress ports disposed off-axial center of the housing body;
a protrusion extending radially outwards from said housing body, said protrusion attached to, or integral with, said housing body and proximate said bottom surface; and
said complementary or paired second magnetic structure located on said housing body or encompassed within and forming a portion of an outer wall surface of said housing body, said second magnetic structure including a polymagnet comprising a complementary plurality of magnetic field emission sources having positions and polarities relating to the predefined spatial force function, the polymagnet having a radially outwardly-facing surface comprising the complementary plurality of field emission sources which presents in a direction away from a center axis of the filter cartridge body;
wherein, upon engagement of the fluid ingress port and fluid egress port of the filter cartridge with ingress and egress fluid receiving ports of the manifold and attachment of said filter cartridge to said filter manifold, said first and second magnetic structures are brought together in said first direction within close proximity to one another such that said magnetic shear force is generated, which moves said latch blocking mechanism away from said latch by the generated magnetic shear force, allowing said latch to pivot radially inwards making contact with said filter cartridge protrusion, securing said filter cartridge to said manifold.

2. The filtration system of claim 1, wherein said latch pivots under a resilient biasing force radially inwards towards said sump housing.

3. The filtration system of claim 2, wherein said latch blocking mechanism includes a blocking arm for retaining said latch against said resilient biasing force when said filter cartridge is not inserted or only partially inserted within said sump housing.

4. The filtration of claim 1, wherein said manifold latch housing includes a release lever having a release lever arm in slidable communication with said latch, such that upon actuation of said release lever, said release lever arm pivots said latch radially outwards away from said filter cartridge protrusion for filter cartridge removal.

5. A method of interconnecting a filter cartridge and a mating filter manifold, comprising:
inserting said filter cartridge into a sump housing of said mating filter manifold, said filter cartridge comprising a housing having a body, a bottom surface, a fluid ingress port and a fluid egress port wherein each of the fluid ingress port and the fluid egress port extend axially upward from a top surface of the housing and off-axial center of the housing body, a protrusion extending radially outwards from said housing body, and a first magnetic structure located on said housing body or encompassed within and forming a portion of an outer wall surface of said housing body, said first magnetic structure including a polymagnet having a plurality of field emission sources having positions and polarities relating to a predefined spatial force function that corresponds to a predetermined alignment of said field emission sources, the first magnetic structure polymagnet having a radially outwardly-facing surface comprising the plurality of field emission sources which presents in a direction away from a center axis of the filter cartridge body;
moving said filter cartridge within said filter manifold sump housing in a first direction parallel to the center axis of the filter cartridge body;
engaging the fluid ingress port and fluid egress port of the filter cartridge with receiving ingress/egress ports of the manifold;
aligning said first magnetic structure plurality of field emission sources with a plurality of field emission sources of a complementary or paired second magnetic structure disposed within a latch blocking mechanism or holder of said filter manifold sump housing such that a magnetic shear force is generated, said latch blocking mechanism in slidable communication with a latch being actuable under a first resilient biasing mechanism and said latch blocking mechanism being biased toward said latch under a second resilient biasing mechanism applying a force to said latch blocking mechanism or holder;
moving, by non-physical magnetic shear force, said latch blocking mechanism away from said latch; and
actuating said latch in a second direction to contact said filter cartridge protrusion, thereby securing said filter cartridge to said manifold, said second direction being different from said first direction.

6. The method of claim 5, including removing said filter cartridge, comprising:
actuating a release lever or button in slidable communication with said latch, said release lever having a release lever arm for moving said latch away from a central axis of said sump housing in a direction opposite the second direction against said first resilient biasing mechanism when said release lever or button is actuated; and
extracting said filter cartridge from said filter manifold.

7. A filtration system comprising:
a filter manifold having ingress and egress fluid receiving ports, a sump housing having an inner cavity for receiving a mating filter cartridge, and a latch housing comprising a latch movable in a radial direction with respect to a central axis of the sump housing and a latch blocking mechanism or holder movable in a direction approximately perpendicular to said radial direction, wherein said latch blocking mechanism includes a first magnetic structure therein, said first magnetic structure including a polymagnet having a plurality of field emission sources having positions and polarities relating to a predefined spatial force function that corresponds to a predetermined alignment of said field emission sources, said latch blocking mechanism movable in a first direction responsive to a non-physical magnetic shear force generated when a complementary or paired second magnetic structure is moved in a direction approximately perpendicular to said first direction and when positioned in close proximity to said first magnetic structure; and
said filter cartridge including:
a housing having a body, a top surface, a bottom surface, an axial length, and an internal cavity;
an ingress port and an egress port, each of the fluid ingress port and the fluid egress port extending axially upward from the top surface and in fluid communication with said internal cavity, said ingress and egress ports disposed off-axial center of the housing body;
a protrusion extending radially outwards from said housing body, said protrusion attached to, or integral with, said housing body and proximate said bottom surface; and
said complementary or paired second magnetic structure located on said housing body or encompassed within and forming a portion of an outer wall surface of said housing body, the second magnetic structure including a polymagnet comprising a complementary plurality of magnetic field emission sources having positions and polarities relating to the predefined spatial force function, the polymagnet having a radially outwardly-facing surface comprising the complementary plurality of field emission sources which presents in a direction away from a center axis of the filter cartridge body;
wherein, upon engagement of the fluid ingress port and fluid egress port of the filter cartridge with ingress and egress receiving ports of the manifold and attachment of said filter cartridge to said filter manifold, said first and second magnetic structures are brought together in said first direction within close proximity to one another such that said magnetic shear force is generated, which moves said latch blocking mechanism away from said latch by the generated shear force, allowing said latch to translate radially inwards making contact with said filter cartridge protrusion, securing said filter cartridge to said manifold.

8. The filtration system of claim 7, wherein said latch translates under a resilient biasing force radially inwards towards said sump housing.

9. The filtration system of claim 7, wherein said latch includes a latch arm for contacting said filter cartridge protrusion when said latch is translated radially inwards.

10. The filtration system of claim 7, wherein said manifold latch housing includes a release lever having a release lever arm in slidable communication with said latch, such that upon actuation of said release lever, said release lever arm translates said latch radially outwards away from said filter cartridge protrusion for filter cartridge removal.

11. A method of interconnecting a filter cartridge and a mating filter manifold, comprising:
inserting said filter cartridge into a sump housing of said mating filter manifold, said filter cartridge comprising a housing having a body, a bottom surface, a fluid ingress port and a fluid egress port wherein each of the fluid ingress port and the fluid egress port extend axially upward from a top surface of the housing and off-axial center of the housing body, a protrusion extending radially outwards from said housing body, said protrusion attached to, or integral with, said housing body and proximate said bottom surface, and a first magnetic structure located on said housing body or encompassed within and forming a portion of an outer wall surface of said housing body, said first magnetic structure including a polymagnet having a plurality of field emission sources having positions and polarities relating to a predefined spatial force function that corresponds to a predetermined alignment of said field emission sources, the first magnetic structure polymagnet having a radially outwardly-facing surface comprising the plurality of field emission sources which presents in a direction away from a center axis of the filter cartridge body;
moving said filter cartridge within said filter manifold sump housing in a first direction parallel to the center axis of the filter cartridge body;
engaging the fluid ingress port and fluid egress port of the filter cartridge with receiving ingress/egress ports of the manifold;
aligning said first magnetic structure plurality of field emission sources with a plurality of magnetic field emission sources of a complementary or paired second magnetic structure disposed within a latch blocking mechanism or holder of said filter manifold such that a magnetic shear force is generated, said latch blocking mechanism in slidable communication with a latch translatable under a first resilient biasing mechanism in a radial direction with respect to a central axis of the sump housing and said latch blocking mechanism being biased toward said latch under a second resilient biasing mechanism applying a force to said latch blocking mechanism or holder, said forced applied by the second resilient biasing mechanism being approximately perpendicular to said sump housing central axis;
moving, by non-physical magnetic shear force, said latch blocking mechanism away from said latch in a direction approximately perpendicular to said radial direction; and
translating said latch radially inwards to contact said filter cartridge protrusion, thereby securing said filter cartridge to said manifold.

12. The method of claim 11 including removing said filter cartridge, comprising:
actuating a release lever or button in slidable communication with said latch, said release lever having a release lever arm for translating said latch radially outwards away from said sump housing central axis against said first resilient biasing mechanism when said release lever or button is actuated; and
extracting said filter cartridge from said filter manifold.

13. A filtration system comprising:
a filter manifold having ingress and egress fluid ports, a sump housing having an inner cavity for receiving a mating filter cartridge, and a latch housing comprising a latch and a latch blocking mechanism or holder, wherein said latch blocking mechanism includes a first magnetic structure therein, said latch blocking mechanism movable in a first direction responsive to a non-physical magnetic shear force generated when a complementary or paired second magnetic structure is moved in a direction approximately parallel to said first direction and when positioned in close proximity to said first magnetic structure; and said filter cartridge including:

a housing having a body, a top surface, a bottom surface, an axial length, and an internal cavity;

an ingress port and an egress port, each of the fluid ingress port and the fluid egress port extending axially upward from the top surface and in fluid communication with said internal cavity, said ingress and egress ports disposed off-axial center of the housing body;

a protrusion extending radially outwards from said housing body, said protrusion attached to, or integral with, said housing body and proximate said bottom surface; and said complementary or paired second magnetic structure located on said housing body or encompassed within and forming a portion of an outer wall surface of said housing body, the second magnetic structure including a polymagnet comprising a complementary plurality of magnetic field emission sources having positions and polarities relating to the predefined spatial force function, the polymagnet having a radially outwardly-facing surface comprising the complementary plurality of field emission sources which presents in a direction away from a center axis of the filter cartridge body;

wherein, upon engagement of the fluid ingress port and fluid egress port of the filter cartridge with ingress and egress fluid receiving ports of the manifold and attachment of said filter cartridge to said filter manifold, said first and second magnetic structures are brought together in said first direction within close proximity to one another such that said magnetic shear force is generated, which moves said latch blocking mechanism away from said latch by the generated magnetic shear force, allowing said latch to translate radially inwards making contact with said filter cartridge protrusion, securing said filter cartridge to said manifold.

14. The filtration system of claim 13 wherein said latch translates under a resilient biasing force radially inwards towards said sump housing.

15. The filtration system of claim 14, wherein said latch blocking mechanism includes a blocking arm for retaining said latch against said resilient biasing force when said filter cartridge is not inserted or only partially inserted within said sump housing.

16. The filtration system of claim 13, wherein said latch includes a notch or seat for receiving said filter cartridge protrusion when said latch is translated radially inwards.

17. The filtration system of claim 13, wherein said manifold latch housing includes a release lever having a release lever arm in slidable communication with said latch, such that upon actuation of said release lever, said release lever arm translates said latch radially outwards away from said filter cartridge protrusion for filter cartridge removal.

18. A method of interconnecting a filter cartridge and a mating filter manifold, comprising:

inserting said filter cartridge into a sump housing of said mating filter manifold, said filter cartridge comprising a housing having a body, a bottom surface, a fluid ingress port and a fluid egress port, wherein each of the fluid ingress port and the fluid egress port extend axially upward from a top surface of the housing and off-axial center of the housing body, a protrusion extending radially outwards from said housing body, said protrusion attached to, or integral with, said housing body and proximate said bottom surface, and a first magnetic structure located on said housing body or encompassed within and forming a portion of an outer wall surface of said housing body, said first magnetic structure including a polymagnet having a plurality of field emission sources having positions and polarities relating to a predefined spatial force function that corresponds to a predetermined alignment of said field emission sources, the first magnetic structure polymagnet having a radially outwardly-facing surface comprising the plurality of field emission sources which presents in a direction away from a center axis of the filter cartridge body;

moving said filter cartridge within said filter manifold sump housing in a first direction parallel to the center axis of the filter cartridge body;

engaging the fluid ingress port and fluid egress port of the filter cartridge with receiving ingress/egress ports of the manifold;

aligning said first magnetic structure plurality of field emission sources with a plurality of magnetic field emission sources of a complementary or paired second magnetic structure disposed within a latch blocking mechanism or holder of said filter manifold such that a magnetic shear force is generated, said latch blocking mechanism in slidable communication with a latch translatable radially inwards under a first resilient biasing mechanism and said latch blocking mechanism being biased towards said latch under a second resilient biasing mechanism applying a force to said latch blocking mechanism or holder, said force applied by the second resilient biasing mechanism being approximately parallel to a central axis of said sump housing;

moving, by magnetic shear force, said latch blocking mechanism away from said latch in a direction approximately parallel to said first direction; and translating said latch radially inwards to contact said filter cartridge protrusion, thereby securing said filter cartridge to said manifold.

19. The method of claim 18 further including removing said filter cartridge, comprising:

actuating a release lever or button in slidable communication with said latch, said release lever having a release lever arm for translating said latch radially outwards away from said sump housing central axis against said first resilient biasing mechanism when said release lever or button is actuated; and extracting said filter cartridge from said filter manifold.

20. The method of claim 5 wherein said protrusion is attached to, or integral with, said housing body and proximate said bottom surface.

21. The method of claim 5 wherein said latch includes a notch or seat, and wherein the step of actuating said latch in said second direction to contact said filter cartridge protrusion further comprises:

receiving said filter cartridge protrusion by said latch notch or seat to secure said filter cartridge to said manifold.

22. The method of claim 5 wherein said force applied by the second resilient biasing mechanism is approximately parallel to a central axis of said sump housing.

23. The method of claim 5 wherein said latch has a pivot axis allowing said latch to pivot radially inwards under said first resilient biasing mechanism, and wherein the step of actuating said latch comprises:

pivoting said latch radially inwards to contact said filter cartridge protrusion.

24. The method of claim 23 further including removing said filter cartridge, comprising:

actuating a release lever or button in slidable communication with said latch, said release lever having a release lever arm for pivoting said latch radially outwards away from said sump housing against said first resilient biasing mechanism when said release lever or button is actuated; and extracting said filter cartridge from said filter manifold.

25. The method of claim 5 wherein said latch is translatable radially inwards under said first resilient biasing mechanism, and wherein the step of moving said latch blocking mechanism away from said latch further comprises:

moving said latch blocking mechanism in a direction approximately parallel to said first direction in response to said magnetic shear force.

26. The method of claim 25 further including removing said filter cartridge, comprising:

actuating a release lever or button in slidable communication with said latch, said release lever having a release lever arm for translating said latch radially outwards away from said sump housing against said first resilient biasing mechanism when said release lever or button is actuated; and extracting said filter cartridge from said filter manifold.

27. The method of claim 5 wherein said force applied by the second resilient biasing mechanism is approximately perpendicular to a central axis of said sump housing.

28. The method of claim 27 wherein said latch is translatable under said first resilient biasing mechanism in a radial direction with respect to said central axis of the sump housing, and wherein the step of moving said latch blocking mechanism away from said latch comprises:

moving said latch blocking mechanism in a direction approximately perpendicular to said radial direction in response to said magnetic shear force.

29. The method of claim 28 wherein said latch is translatable radially inwards under said first resilient biasing mechanism, and wherein the step of actuating said latch further comprises:

translating said latch radially inwards to contact said filter cartridge protrusion.

30. The method of claim 5 wherein the latch blocking mechanism is disposed on a sump housing sidewall and the second magnetic structure includes a radially outwardly-facing surface comprising the plurality of field emission sources which presents in a direction towards the center axis of the filter cartridge body.

31. The method of claim 11 wherein the latch blocking mechanism is disposed on a sump housing sidewall and the second magnetic structure includes a radially outwardly-facing surface comprising the plurality of field emission sources which presents in a direction towards the center axis of the filter cartridge body.

32. The method of claim 18 wherein the latch blocking mechanism is disposed on a sump housing sidewall and the second magnetic structure includes a radially outwardly-facing surface comprising the plurality of field emission sources which presents in a direction towards the center axis of the filter cartridge body.

* * * * *